US012709037B2

(12) United States Patent
Palero et al.

(10) Patent No.: US 12,709,037 B2
(45) Date of Patent: Aug. 18, 2026

(54) ELECTRIC SHAVERS

(71) Applicant: KONINKLIJKE PHILIPS N.V., Eindhoven (NL)

(72) Inventors: Jonathan Alambra Palero, Waalre (NL); Gerardus Johannes Nicolaas Doodeman, Veldhoven (NL); Peter Johannes Antonius Raedts, Sevenum (NL); Bruno Jean Francois Frackowiak, De Haag (NL); Cornelis Gerardus Visser, Eindhoven (NL); Babu Varghese, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 94 days.

(21) Appl. No.: 18/867,477

(22) PCT Filed: May 6, 2023

(86) PCT No.: PCT/EP2023/062072
§ 371 (c)(1),
(2) Date: Nov. 20, 2024

(87) PCT Pub. No.: WO2023/222418
PCT Pub. Date: Nov. 23, 2023

(65) Prior Publication Data

US 2025/0345959 A1 Nov. 13, 2025

(30) Foreign Application Priority Data

May 20, 2022 (EP) .................................... 22174680

(51) Int. Cl.
*B26B 21/48* (2006.01)
*H05B 6/64* (2006.01)

(52) U.S. Cl.
CPC ............... *B26B 21/48* (2013.01); *H05B 6/64* (2013.01)

(58) Field of Classification Search
CPC ....... B26B 21/48; B26B 21/00; B26B 21/405; B26B 21/4056; B26B 19/00; B26B 19/02;
(Continued)

(56) References Cited

U.S. PATENT DOCUMENTS 5,383,917 A 1/1995 Desai
9,532,832 B2 1/2017 Ron Edoute
(Continued)

FOREIGN PATENT DOCUMENTS

CN 109498996 A 3/2019
EP 3978212 A1 4/2022

OTHER PUBLICATIONS

International Search Report Dated Sep. 22, 2023 for International Appln No. PCT/EP2023/062072.

*Primary Examiner* — Phong H Nguyen

(57) ABSTRACT

According to an aspect, there is provided an electric shaver (100, 900, 1000, 1100, 1400, 1600) that comprises: a skin-contacting area (200, 910, 1110, 1410, 1610) arranged to contact skin of a user during use of the shaver (100, 900, 1000, 1100, 1400, 1600); at least two hair-cutting units (150, 160, 170, 1480, 1680) arranged in the skin-contacting area (200, 910, 1110, 1410, 1610) and each having an external cutting member (152, 162, 172, 1482, 1682) with a plurality of hair-entry openings and an internal cutting member covered by and moveable relative to the external cutting member (152, 162, 172, 1482, 1682); N electrodes (180*a-d*) arranged in the skin-contacting area (200, 910, 1110, 1410, 1610) to contact the skin during use, wherein N is at least 3; a radio-frequency (RF) generator (320) configured to gen-
(Continued)

erate RF energy having a basic frequency $f_{RF}$ and a basic period $T_{RF}=1/f_{RF}$; an RF energy modulator (310) configured to transform the RF energy generated by the RF generator into N periodic amplitude-modulated RF energy signals and to provide each of the N periodic amplitude-modulated RF energy signals (SI, S2, S3) to a respective one of the N electrodes (180*a-d*); wherein: seen perpendicularly to the skin-contacting area (200, 910, 1110, 1410, 1610), the external cutting member (152, 162, 172, 1482, 1682) of each hair-cutting unit (150, 160, 170, 1480, 1680) has a geometric center point (156, 166, 176, 1486, 1686), a first pitch distance (202) being a distance between the geometric center points (156, 166, 176, 1486, 1686) of a pair of the hair-cutting units (150, 160, 170, 1480, 1680), and a first minimum pitch distance being a minimum of the first pitch distances of all pairs of the hair-cutting units (150, 160, 170, 1480, 1680); seen perpendicular to the skin-contacting area (200, 910, 1110, 1410, 1610), each of the N electrodes (180*a-d*) has a geometric center point (182*a-c*), a second pitch distance (204) being a distance between the geometric center points (182*a-c*) of a pair of the N electrodes (180*a-d*), and a second minimum pitch distance being a minimum of the second pitch distances (204) of all pairs of the N electrodes (180*a-d*); a ratio between the second minimum pitch distance and the first minimum pitch distance is at least 0.8; a basic period $T_{MOD}$ of the N periodic amplitude-modulated RF energy signals (S1, S2, S3) is larger than the basic period $T_{RF}$; and an $n^{th}$ of the N periodic amplitude-modulated RF energy signals (S1, S2, S3) has a phase difference of $T_{MOD}$*(U−1)/N relative to a first of the N periodic amplitude-modulated RF energy signals (S1, S2, S3), wherein 2≤n≤N.

15 Claims, 16 Drawing Sheets

(58) Field of Classification Search

CPC ......... B26B 19/04; B26B 19/12; B26B 19/14; B26B 19/38; B26B 19/3806; B26B 19/382; B26B 19/3873

USPC .................. 30/34.05, 43.4–43.92, 42, 44, 45

See application file for complete search history.

(56) References Cited

U.S. PATENT DOCUMENTS

| | | | | |
|---|---|---|---|---|
| 2008/0004678 | A1 | 1/2008 | Kreindel | |
| 2009/0049694 | A1 * | 2/2009 | Morris | B26B 19/388 30/43.6 |
| 2010/0198134 | A1 | 8/2010 | Eckhouse | |
| 2011/0167640 | A1 | 7/2011 | Flyash | |
| 2013/0231611 | A1 | 9/2013 | Lischinsky | |
| 2018/0000533 | A1 | 1/2018 | Boll | |
| 2021/0290953 | A1 | 9/2021 | Lischinsky | |
| 2021/0308452 | A1 | 10/2021 | Kern | |
| 2022/0055237 | A1 * | 2/2022 | Cordani | B26B 19/46 |
| 2023/0347534 | A1 * | 11/2023 | Lap | B26B 19/382 |

* cited by examiner

Dual statemodulation

Asymmetric triple statemodulation

Symmetric triple statemodulation

ELECTRIC SHAVERS

CROSS-REFERENCE TO PRIOR APPLICATIONS

This application is a U.S. National Phase patent application under 35 U.S.C. § 371 of International Patent Application No. PCT/EP2023/062072, filed on May 6, 2023, which claims the benefit of European Patent Application No. 22174680.3 filed on May 20, 2022. These applications are hereby incorporated by reference herein.

FIELD OF THE INVENTION

The present application relates to an electric shaver, and in particular, relates to an electric shaver comprising a radio frequency (RF) generator unit for heating skin, in use.

BACKGROUND OF THE INVENTION

It is generally acknowledged that the application of heat to skin around a certain temperature range, for example, from about 38° C. to 40° C. can evoke a pleasant thermal sensation. Skin warming methods range from applying hot towels, steam, infrared light etc. to skin. Integrating a skin warming unit in a personal care device generally improves the sensorial experience for a user during performance of the personal care routine.

One such personal care device which has employed a skin warming unit are electric shavers. Electric shavers are known which include a heated mechanical element, which can provide warmth to the skin during shaving via the thermal transfer of heat. The warmth produces a pleasant feeling thus improving user experience.

Another method to heat skin is the use of deep dermal heating using radio frequency (RF) energy. The use of the RF energy is different from the heated mechanical elements, which use thermal transfer to provide heating. In RF heating applications, two electrodes are applied to the skin, which each apply oppositely charged RF energy to the skin. This generates an electric field in the skin, between the two electrodes. The RF energy can penetrate deeper into the skin than the thermal transfer due to heated mechanical elements and thus heating can be applied to a relatively large region of the skin. The heating can be applied across the entire depth of penetration without having to rely on thermal conductivity of both the heat applicator and the skin, as is required by the use of heated mechanical elements.

RF based skin heating first found use in skin care applications and in tissue ablation, where, for example, tumors in organs may be ablated through the application of RF energy to heat the tumour. The ability of the RF energy to penetrate deeply into skin tissues and the ease-of-control of RF energy made the technology desirable for these applications.

In general, RF energy delivery parameters such as electrical and physical properties, e.g. contact electrode geometry, can be tailored to a particular application. Typically, large RF electrodes receiving low RF voltages are used in skin care applications while small RF electrodes receiving high RF voltages are used in surgical applications.

Superficial RF heating applications, for example, used in a home-use skin care device, involve the use of bipolar RF energy where two contact electrodes are substantially close to each other and the current flow is localized to a small region. In contrast, clinical RF heating applications use an approach referred to as monopolar RF, where one of the contact electrodes is placed far from the other electrode(s) causing the electrical current to flow through the human body.

Another RF skin heating approach, used in clinical applications, is to apply the RF energy to skin using several electrodes, for example more than two, and phase shift or steer the RF energy applied to each electrode. For example, U.S. Pat. No. 5,383,917 discloses a multi-phase RF ablation technique employing a two-dimensional or three-dimensional electrode array producing a multitude of current paths on the surface of the ablation zone, resulting in a uniform lesion with a size defined by the span of the electrode array. US20130231611 discloses electrosurgical methods and devices that are provided for applying phase controlled RF energy to a treatment site comprising a multi-electrode electrosurgical probe electrically coupled to a plurality of RF generators.

SUMMARY OF THE INVENTION

One of the challenges of using bipolar RF energy for skin tissue heating is controlling the homogeneity of heating within the tissue volume. When applying RF heating to skin using an electric shaver, homogenous heating of the skin with minimal hotspots is desired for a pleasant warming experience and to avoid any discomfort. The use of large and multiple electrodes are common approaches to minimize hotspots. However, this effect is limited by the fact that most of the heating occurs between the two closest electrodes. By phase shifting or steering the RF energy between multiple electrodes, such as described in U.S. Pat. No. 5,383,917 and US20130231611, the RF field can be better distributed in the tissue resulting in more homogenous tissue heating. These solutions, however, use costly and bulky RF phase steering devices necessary to generate multi-phase RF signals. In an electric shaver, where the space is limited, it is not generally practical to use such relatively large phase steering devices. It has also been observed that the thermal effect of the phase shifting or steering solutions can be sensitive to the accuracy of the phase differences between RF signals.

There is therefore a need for improved systems and methods for improved RF-based homogenous warming of skin using an electric shaver.

According to a first specific aspect, there is provided a an electric shaver that comprises: a skin-contacting area arranged to contact skin of a user during use of the shaver; at least two hair-cutting units arranged in the skin-contacting area and each having an external cutting member with a plurality of hair-entry openings and an internal cutting member covered by and moveable relative to the external cutting member; N electrodes arranged in the skin-contacting area to contact the skin during use, wherein N is at least 3; a radio-frequency (RF) generator configured to generate RF energy having a basic frequency $f_{RF}$ and a basic period $T_{RF}=1/f_{RF}$; an RF energy modulator configured to transform the RF energy generated by the RF generator into N periodic amplitude-modulated RF energy signals and to provide each of the N periodic amplitude-modulated RF energy signals to a respective one of the N electrodes; wherein: seen perpendicularly to the skin-contacting area, the external cutting member of each hair-cutting unit has a geometric center point, a first pitch distance being a distance between the geometric center points of a pair of the hair-cutting units, and a first minimum pitch distance being a minimum of the first pitch distances of all pairs of the hair-cutting units; seen perpendicular to the skin-contacting area, each of the N electrodes has a geometric center point, a second pitch distance being a distance between the geometric center points of a pair of the N electrodes, and a second minimum pitch distance being a minimum of the second pitch distances of all pairs of the N electrodes; a ratio between the second minimum pitch distance and the first minimum pitch distance is at least 0.8; a basic period $T_{MOD}$ of the N periodic amplitude-modulated RF energy signals is larger than the basic period $T_{RF}$; and an $n^{th}$ of the N periodic amplitude-modulated RF energy signals has a phase difference of $T_{MOD}$*(n−1)/N relative to a first of the N periodic amplitude-modulated RF energy signals, wherein 2≤n≤N. In some examples, a ratio between $T_{MOD}$ and $T_{RF}$ may be at least 10, preferably at least 25.

In some examples, each of the respective N periodic amplitude-modulated RF energy signals may have an identical basic RF energy signal during the basic period $T_{MOD}$ of the respective periodic amplitude-modulated RF energy signal.

In some examples, the basic RF energy signal may comprise a first state and a second state, the first state being constituted by a first RF energy signal having the basic frequency $f_{RF}$ and a first RF voltage, and the second state being constituted by a zero signal.

In some examples, the basic RF energy signal may further comprise a third state being constituted by a second RF energy signal inverse to the first RF energy signal.

In some examples, the first states of the N periodic amplitude-modulated RF energy signals may not occur simultaneously.

In some examples, the second states of the N periodic amplitude-modulated RF energy signals may not occur simultaneously.

In some examples, the N electrodes are arranged adjacent to the hair-cutting units.

In some examples, the electric shaver may comprise three electrodes and three hair-cutting units mutually arranged in a triangular configuration, wherein the internal cutting member of each hair-cutting unit is rotatable relative to the external cutting member, and wherein each of the three electrodes is arranged in a lateral portion of the skin-contacting area between the two hair-cutting units of a respective one of three pairs of hair-cutting units.

In some examples, the electric shaver may comprise N hair-cutting units, wherein the external cutting member of each of the N hair-cutting units is annular-shaped and wherein the N electrodes comprise N covering elements each arranged in a central position relative to the external cutting member of a respective one of the N hair-cutting units.

In some examples, the electric shaver may comprise N hair-cutting units, wherein each of the N electrodes is constituted by at least a skin-contacting portion of the external cutting member of a respective one of the N hair-cutting units.

In some examples, the electric shaver may comprise three hair-cutting units, wherein the internal cutting member of each hair-cutting unit is configured to make a linear reciprocating motion relative to the external cutting member parallel to a longitudinal direction, and wherein the external cutting member of each hair-cutting unit has a longitudinal extension parallel to the longitudinal direction. In some examples, the electric shaver may comprise four electrodes and four hair-cutting units, wherein: the internal cutting member of each hair-cutting unit may be configured to make a linear reciprocating motion relative to the external cutting member parallel to a longitudinal direction, and wherein the external cutting member of each hair-cutting unit may have a longitudinal extension parallel to the longitudinal direction; each of the four electrodes may be constituted by at least a skin-contacting portion of the external cutting member of a respective one of the four hair-cutting units; the basic RF energy signal may comprise, successively, a first state, a second state, a third state, and a fourth state, the first state being constituted by a first RF energy signal having the basic frequency $f_{RF}$ and a first RF voltage, the second state being constituted by a second RF energy signal having the basic frequency $f_{RF}$ and a second RF voltage lower than the first RF voltage, the third state being constituted by a third RF energy signal inverse to the second RF energy signal, and the fourth state being constituted by a fourth RF energy signal inverse to the first RF energy signal.

In some examples, a ratio between the second RF voltage and the first RF voltage may be between 0.25 and 0.5, preferably between 0.3 and 0.35.

In some examples, the RF energy modulator comprises N switch units each configured to apply a respective one of the N periodic amplitude-modulated RF energy signals to a respective one of the N electrodes.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

Figure 1:
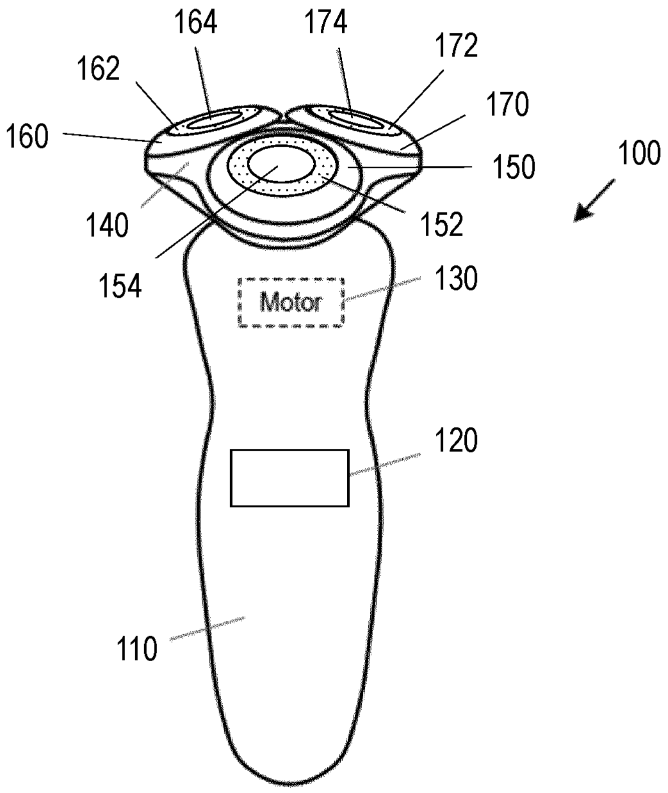
FIG. 1 is an example of an electric shaver.

Examples according to the present disclosure provide an electric shaver comprising a skin-contacting area arranged to contact skin of a user during use of the shaver. At least two hair-cutting units are arranged in the skin-contacting area and N electrodes, for conducting RF energy, are also arranged in the skin-contacting area to contact the skin during use, where N is at least three. Seen perpendicularly to the skin-contacting area, the external cutting member of each hair-cutting unit has a geometric center point and a first pitch distance being a distance between the geometric center points of a pair of the hair-cutting units. A first minimum pitch distance is a minimum of the first pitch distances of all pairs of the hair-cutting units Additionally, seen perpendicularly to the skin-contacting area, each of the N electrodes has a geometric center point, a second pitch distance being a distance between the geometric center points of a pair of the N electrodes. A second minimum pitch distance being a minimum of the second pitch distances of all pairs of the N electrodes. A ratio between the second minimum pitch distance and the first minimum pitch distance is at least 0.8. This arrangement of the hair cutting units and the N electrodes results in the N electrodes being spread out across a substantial area of the skin-contacting area. As such, in use with the skin-contacting area applied to the skin of the user, RF energy may flow between the N electrodes such that a large majority of the skin, in contact with the skin-contacting area is warmed, leading to improved homogenous warming of the skin.

An electric shaver according to examples of the present disclosure further comprises an RF generator configured to generate RF energy having a basic frequency $f_{RF}$ and a basic period $T_{RF}=1/f_{RF}$ and an RF energy modulator configured to transform the RF energy generated by the RF generator into N periodic amplitude-modulated RF energy signals and to provide each of the N periodic amplitude-modulated RF energy signals to a respective one of the N electrodes. A basic period $T_{MOD}$ of the N periodic amplitude-modulated RF energy signals is larger than the basic period $T_{RF}$ and an $n^{th}$ of the N periodic amplitude-modulated RF energy signals has a phase difference of $T_{MOD}*(n-1)/N$ relative to a first of the N periodic amplitude-modulated RF energy signals, wherein $2 \leq n \leq N$. Modulating the RF energy into the N periodic amplitude-modulated RF energy signals, which are phase shifted with respect to one another, avoids the use of costly and bulky RF phase steering devices used in prior art solutions. As will be described in more detail below, the phase shifted N periodic amplitude-modulated RF energy signals result in RF energy following by differing amounts and between different ones of the N electrodes over different periods, which further leads to more homogenous heating of the skin in contact with the skin-contacting area and can avoid the build up of hotspots.

FIG. 1 is an illustration of an exemplary electric shaver 100 to which the techniques described herein can be applied. In FIG. 1 the electric shaver 100 is in the form of a rotary shaver, but it will be appreciated that the techniques described herein can be applied to any type of electric shaver 100, such as a foil shaver, as described below. The electric shaver 100 comprises a main body 110 that is to be held in a hand of a user, and a cutting head 140 in the form of a skin-contacting area that includes a plurality of hair-cutting units 150, 160, 170 for cutting/shaving hair. The cutting head of the electric shaver comprises a skin-contacting area arranged to contact skin of a user during use of the shaver. In the illustrated example of FIG. 1, the skin-contacting area comprises a first hair-cutting unit 150, a second hair-cutting unit 160 and a third hair-cutting unit 170. However, in other examples the skin-contacting area may comprise two hair-contacting units or may comprise more than three hair-cutting units.

The first hair-cutting unit 150 comprises a first external cutting member 152, second hair-cutting unit 160 comprises a second external cutting member 162 and third hair-cutting unit 170 comprises a third external cutting member 172. The first, second and third hair-cutting units 150, 160, 170 may be mounted in cutting head 140 at suitable mounting positions. In this illustrated embodiment, the hair-cutting units 150, 160, 170 have a triangular arrangement, but it will be appreciated that the hair-cutting units can be arranged in alternative arrangements. The external cutting members 152, 162, 172 of the hair-cutting units each comprise a plurality of hair-entry openings, which are arranged, in use, to contact skin. The respective skin-contacting areas of the first, second and third hair external cutting members 152, 162, 172, are annular shaped (i.e. ring shaped). Each of the first, second and third hair-cutting units 150, 160, 170 further comprises a respective internal cutting member, for example, a blade that is rotatable relative to their respective external cutting members 152, 162, 172. The external cutting members 152, 162, 172 are arranged to cover their respective internal cutting member. The hair-entry openings may comprise holes and/or lamellae. In use, hairs may thus protrude through the hair-entry openings and rotation of the blade relative to the external cutting members 152, 162, 172 cuts the hairs protruding through the openings. The electric shaver 100 thus further comprises motor 130 configured to move the internal cutting members relative to the respective external cutting members 152, 162, 172 to effect the cutting action.

First hair-cutting unit 150, second hair-cutting unit 160 and third hair-cutting unit 170 further comprise first covering element 154, second covering element 164 and third covering element 174, respectively. Each of the first, second and third covering elements 154, 164, 174 are arranged on the first, second and third external cutting member 152, 162, 172, respectively. The first, second and third covering elements 154, 164, 174 each comprise a skin-contacting area arranged, in use, to contact skin. Each of the first, second and third covering elements 154, 164, 174 are further arranged centrally relative to the respective annular-shaped skin-contacting area of the first, second and third external cutting member 152, 162, 172, such that the skin-contacting areas of the external cutting members 152, 162, 172 surround a respective covering element 154, 164, 174. As illustrated in FIG. 1, each covering element 154, 164, 174 is disc-shaped, and thus a covering element which may also be referred to as a cap, a shaving cap or a deco cap. Those skilled in the art will be aware of other suitable shapes and/or forms for the covering element.

As will be described in greater detail below, electric shaver 100 further comprises N electrodes (not illustrated in FIG. 1) arranged in the skin-contacting area to contact the skin during use. In examples according to the present disclosure the N electrodes comprise at least three electrodes. The N electrodes are configured to conduct RF energy such that, in use, the RF energy is applied to the skin in contact with the skin-contacting area of the electric shaver to warm the skin. As such, electric shaver 100 further comprises RF energy generator unit 120, which, as will be described in more detail below, is configured to generate RF energy for application to each of the N electrodes in the form of N periodic amplitude-modulated RF energy signals.

Figure 2:
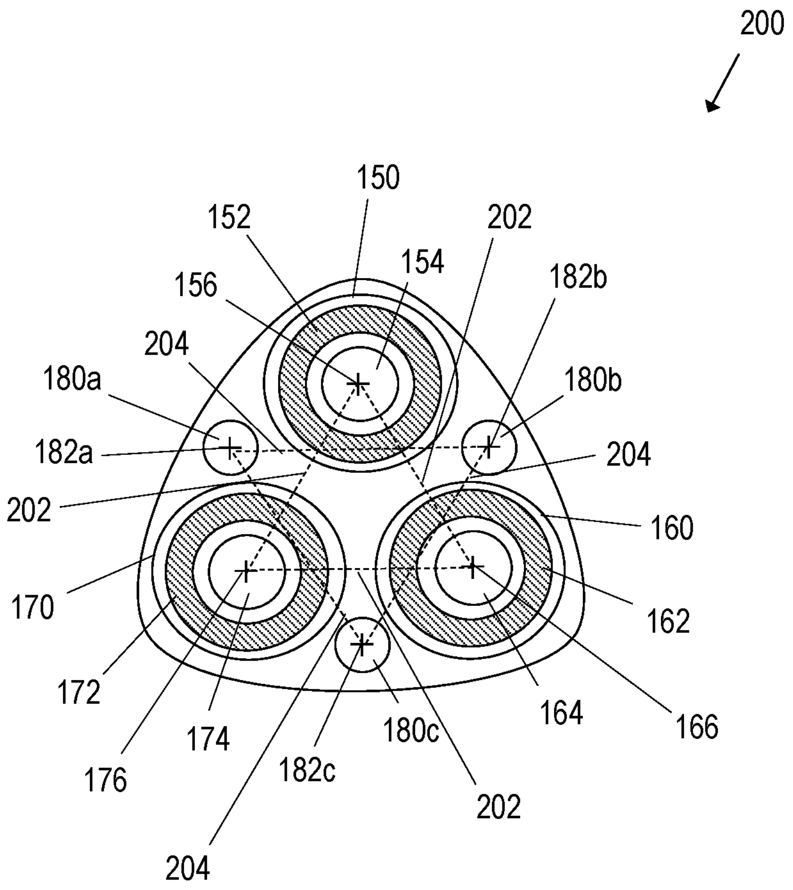
FIG. 2 is an example of a cutting head of an electric shaver.

FIG. 2 illustrates a skin-contacting area 200 of an electric shaver. The skin-contacting area may thus be comprised in the cutting head of an electric shaver. FIG. 2 illustrates the skin-contacting area 200 as viewed perpendicularly relative to the surface of the skin-contacting area. The skin-contacting area comprises first hair-cutting unit 150, second hair-cutting unit 160 and third hair-cutting unit 170, which may operate in a corresponding manner, as described above with respect to FIG. 1.

Skin-contacting area 200 further comprises first electrode 180*a*, second electrode 180*b* and third electrode 180*c*, which together comprise N electrodes 180*a-c*. As illustrated in FIG. 2, the N electrodes 180*a-c* are arranged adjacent to the hair-cutting units 150, 160, 170. The N electrodes 180*a-c* and the three hair-cutting units, 150, 160, 170, are thus mutually arranged in a triangular configuration where each of the three N electrodes 180*a-c* is arranged in a lateral portion of the skin-contacting area 200 between a respective one of three pairs of hair-cutting units 150, 160, 170. For example, the first electrode 180*a* is arranged in a lateral portion of the skin-contacting area 200 between a pair of hair cutting units comprising the first hair-cutting unit 150 and the third hair-cutting unit 170.

In use, the electrodes 180*a-c* are configured to apply N periodic amplitude-modulated RF energy signals to the skin of a user to warm the skin. The electrodes 180*a-c* are thus formed of an electrically conductive material that is able to conduct the N periodic amplitude-modulated RF energy signals but is also bio-compatible with skin. For example, electrodes 180*a-c* may be formed of a metal, such as stainless steel, silver or silver-chloride. The electrodes 180*a-c* may thus additionally be electrically isolated from one another such that a 'circuit' is formed between the electrodes when they are put in contact with the skin of a user.

As illustrated in FIG. 2, each of the hair-cutting units 150, 160, 170 each comprise a respective geometric center point 156, 166, 176. Each of the N electrodes 180*a-c* also comprise a respective geometric center point 182*a-c*. A first pitch distance 202 is a distance between the geometric center points 156, 166, 176 of a pair of the hair-cutting units 150, 160, 170. As illustrated in FIG. 2, each of the hair-cutting units 150, 160, 170 are arranged such that the first pitch distance 202 between each pair of the hair-cutting units 150, 160, 170 is substantially the same. However, in other examples, the first pitch distance 202 between pairs of the hair-cutting units 150, 160, 170 may be different. Similarly, a second pitch distance 204 is a distance between the geometric center points 182*a-c* of a pair of the N electrodes 180*a-c*. As illustrated in FIG. 2, each of the N electrodes 180*a-c* are arranged such that the second pitch distance 204 between each pair of the N electrodes 180*a-c* is substantially the same. However, in other examples, the distance between pairs of the hair-cutting units 150, 160, 170 may be different. Regardless of the arrangement, a first minimum pitch distance 202 is a minimum of the first pitch distances of all pairs of the hair-cutting units 150, 160, 170 and a second minimum pitch distance 204 is a minimum of the second pitch distances of all pairs of the N electrodes 180*a-c*. In order to provide skin warming across a majority of the skin-contacting area 200, a ratio between the second minimum pitch distance 204 and the first minimum pitch distance 202 is at least 0.8. With this ratio, the N electrodes 180*a-c* may be evenly distributed, with the hair-cutting units 150, 160, 170, across a major portion of the skin-contacting area 200, which may thus lead to more uniform warming of the skin in contact with the skin-contacting area 200 during use. For example, due to the arrangement of the N electrodes 180*a-c*, RF energy may flow between each of the N electrodes 180*a-c*, such that a majority of the skin in contact with the skin-contacting area 200 is warmed by the application of the RF energy.

As described above, an electric shaver according to examples of the present disclosure comprises an RF energy generator unit configured to provide each of the N electrodes 180*a-c* with a respective one of N periodic amplitude-modulated RF energy signals. Each of the N periodic amplitude-modulated RF energy signals are phase shifted from one another over N phases, such that over the N phases. RF energy flows between different ones of the N electrodes by differing amounts, which leads to increased uniform heating of the skin in contact with the skin-contacting area of an electric shaver according to examples of the present disclosure.

Figure 3:
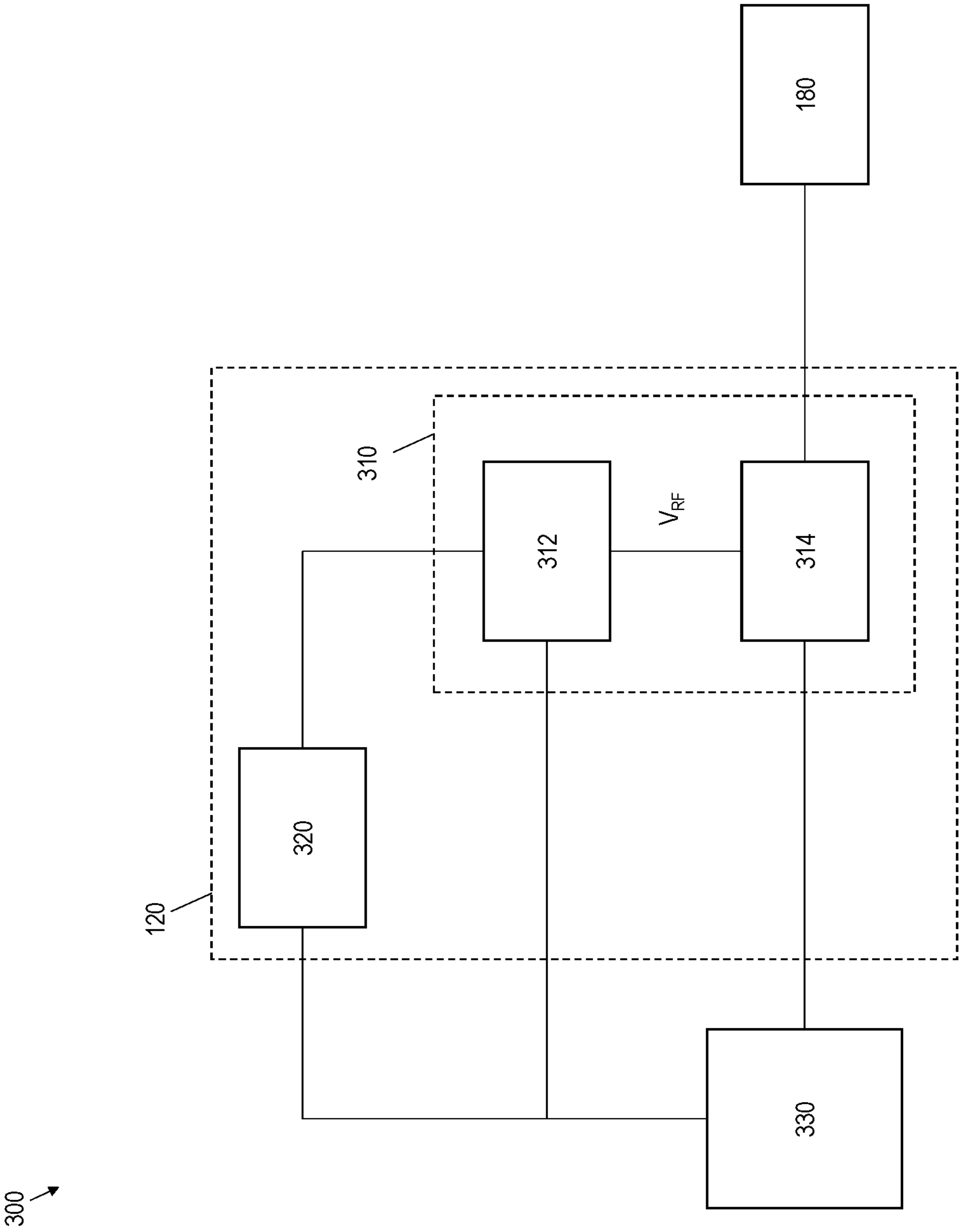
FIG. 3 is an example of circuitry for applying RF energy to electrodes.

FIG. 3 illustrates an example of circuitry 300. Circuitry 300 comprises RF energy generator unit 120, which may be comprised in an electric shaver according to examples of the present disclosure. The RF energy generator unit 120 comprises an RF energy generator 320 configured to generate RF energy having a basic frequency $f_{RF}$ and a basic period $T_{RF}$. RF energy generator unit 120 further comprises an RF energy modulator 310 configured to transform the RF energy generated by the RF generator into N periodic amplitude-modulated RF energy signals and to provide each of the N periodic amplitude-modulated RF energy signals to a respective one of the N electrodes 180. As will be described in more detail below. RF energy modulator 310 comprises a converter unit 312 configured to receive the RF energy from the RF energy generator 320 and output at least one RF voltage signal $V_{RF}$. The RF voltage signal $V_{RF}$ is output to a switch module 314, which outputs the N periodic amplitude-modulated RF energy signals to the N electrodes 180. As will be described in more detail below, under control from the microcontroller unit (MCU) 330. RF energy modulator 310 is configured to transform the RF energy generated by the RF generator 320 into N periodic amplitude-modulated RF energy signals.

For example, MCU 330 may control the RF energy modulator 310 such that the RF voltage signal $V_{RF}$ output from the converter unit 312 is modulated, by the switch module 314 according to an RF modulation waveform. The RF modulation waveform may have a basic RF energy signal. A basic period $T_{MOD}$ of the RF modulation waveform is larger than the RF period $T_{RF}$ of the RF energy output from the RF energy generator 320. In some examples, the period of the RF modulation waveform $T_{MOD}$ may be substantially larger that the RF period $T_{RF}$, for example, by a factor of at least 10 and preferably at least 25. By modulating the RF energy output from the RF energy generator 320 with an RF modulation waveform with a larger period than the period of the RF energy, the phases of the N periodic amplitude-modulated RF energy signals may be shifted with respect to one another without the use of bulk and costly RF phase steering components. Instead, by appropriate control of the switch module 314, the N periodic amplitude-modulated RF energy signals may thus be applied to the N electrodes 180, where each of the N periodic amplitude-modulated RF energy signals are phase shifted from one another. For example, an $n^{th}$ of the N periodic amplitude-modulated RF energy signals is phase shifted by a difference of $T_{MOD}*(n-1)/N$ relative to a first of the N periodic amplitude-modulated RF energy signals, wherein $2 \leq n \leq N$. Thus, when N=3, the N periodic amplitude-modulated RF energy signals may be shifted from each other over three phases for application to the electrodes 180.

Figure 4C:
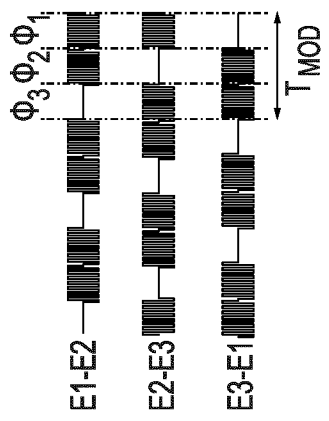
FIGS. 4*a-c* are examples of RF signals.
Figure 4B:
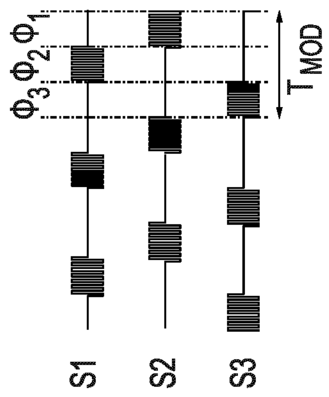
Figure 4A:
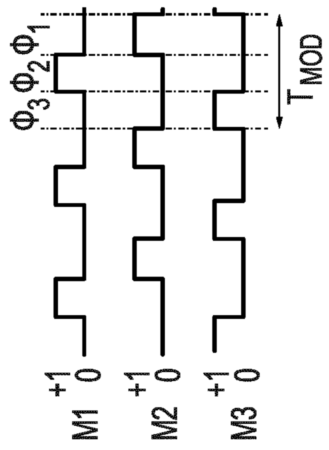

FIGS. 4*a-c* illustrate examples of RF signals applied to N electrodes. In the illustrated example of FIGS. 4*a-c*, N=3.

FIG. 4*a* illustrates three modulation signals M1, M2, M3 for modulating an RF voltage signal $V_{RF}$. The first modulation signal M1 is for modulating the RF voltage signals $V_{RF}$ applied to a first electrode, the second modulation signal M2 is for modulating the RF voltage signal $V_{RF}$ applied to a second electrode and the third modulation signal M3 is for modulating the RF voltage signal $V_{RF}$ applied to a third electrode. The three modulation signals M1, M2, M3 comprise the same RF modulation waveform. In the illustrated example of FIG. 4*a*, the Rf modulation waveform comprises a dual state modulation waveform, and as such, the modulation signals M1-M3 are dual state modulation signals. The dual state modulation signals M1-M3 comprise a first state +1 and a second state 0.

Each of the N modulation signals M1, M2, M3 has a modulation period $T_{MOD}$, which may be divided into three phases $\Phi_{1-3}$. Each of the N modulation signals M1, M2, M3 are phase shifted from each other over the three phases $\Phi_{1-3}$. As illustrated, during a first phase $Q_1$, the first modulation signal M1 is at the second state 0, during the second phase $Q_2$, the first modulation signal M1 is at the first state +1 and during the third phase $Q_3$, the first modulation signal M1 is at the second state 0. The second modulation signal M2 is thus phase shifted from the first modulation signal M1 by a factor of one phase and the third modulation signal is phase shifted from the first modulation signal M1 by a factor of two phases. Thus, the modulation signals are phase shifted from each other according to the condition that an $n^{th}$ of the N modulation signals M1-M3 signals has a phase difference of $T_{MOD}*(n-1)/N$ relative to a first of the N modulation signals M1-M3, where $2 \leq n \leq N$.

FIG. 4*b* illustrates the N periodic amplitude-modulated RF voltage signals S1-S3 applied to the N electrodes, which in some examples may be referred to as N periodic amplitude-modulated RF energy signals S1-S3. The first periodic amplitude-modulated RF energy signal S1 is applied to a first electrode, the second periodic amplitude-modulated RF energy signal S2 is applied to a second electrode and the third periodic amplitude-modulated RF energy signal S3 is applied to a third electrode. The first, second and third periodic amplitude-modulated RF energy signals S1-S3 have been formed by modulating the RF voltage signal according to the first, second and third modulation signals M1-M3 signals, respectively. As such, in a similar manner to the N modulation signals M1-M3, the N periodic amplitude-modulated RF energy signals are thus also phase shifted from each other according to the condition that an $n^{th}$ of the N periodic amplitude-modulated RF energy signals S1-S3 has a phase difference of $T_{MOD}*(n-1)/N$ relative to a first of the N periodic amplitude-modulated RF energy signals S1-S3, where $2 \leq n \leq N$. In some examples, the modulation of the RF voltage signal $V_{RF}$ may be performed by appropriate control of the switch module 314 illustrated in FIG. 3, as will be described in more detail below.

As illustrated in FIG. 4*b*, the RF voltage signal may comprise a modulated RF voltage signal, for example, a pulse width modulated (PWM) signal with a basic RF frequency $f_{RF}$. Thus, referring to FIGS. 4*a* and 4*b*, during phases $\Phi_{1-3}$ in which the modulation signals M1-M3 are at the first state +1, the N periodic amplitude-modulated RF energy signals S1-S3 comprise the PWM RF voltage signal and during phases $\Phi_{1-3}$ in which the modulation signals M1-M3 are at the first state +1, the N periodic amplitude-modulated RF energy signals S1-S3 comprise a zero voltage signal. For example, referring to FIG. 4*a*, in the first phase $\Phi_1$ the first modulation signal M1 and the second modulation signal M2 are at the second state 0 and the second modulation signal M2 is at the first state +1. Thus, referring to FIG. 4*b*, in the first phase $\Phi_1$, the first periodic amplitude-modulated RF energy signal S1 and the third periodic amplitude-modulated RF energy signal S3 are at the 0 voltage level and the second periodic amplitude-modulated RF energy signal S2 modulates according to the PWM RF voltage signal. During the second and third phases $\Phi_{2-3}$, the N periodic amplitude-modulated RF energy signals S1-S3 are thus output in a similar way depending on whether their corresponding modulation signal M1-M3 is at the first state +1 or the second state 0. In some examples, the modulation signals M1-M3 may thus represent the envelope of the N periodic amplitude-modulated RF energy signals S1-S3.

As illustrated in FIG. 4*b*, in some examples, the first states of the N periodic amplitude-modulated RF energy signals S1-S2 do not occur simultaneously. For example, over the three phases $\Phi_{1-3}$, within any one phase, no plurality of the N periodic amplitude-modulated RF energy signals S1-S3 comprise the RF voltage signal $V_{RF}$, which in some examples may be referred to as the “first state” of the N periodic amplitude-modulated RF energy signals S1-S3.

FIG. 4*c* illustrates RF electrode pair signals illustrating the flow of RF current between electrodes E1-E3. In some examples, the RF electrode pair signals may illustrate the flow of RF energy between electrodes E1-E3. For example, first RF electrode pair signal E1-E2 illustrates the flow of RF energy between the first electrode E1 and the second electrode E2, second RF electrode pair signal E2-E3 illustrates the flow of RF energy between the second electrode E2 and the third electrode E3 and third RF electrode pair signal E3-E1 illustrates the flow of RF energy between the third electrode E3 and the first electrode E1.

RF energy flows between different ones of the electrodes E1-E3 over the three phases $\Phi_{1-3}$ and according to the N periodic amplitude-modulated RF energy signals S1-S3 applied to the electrodes E1-E3 during any one phase. For example, during the first phase $\Phi_1$ an RF energy signal is present between the first electrode E1 and the second electrode E2 and between the second electrode E2 and the third electrode E3, as represented by the first RF electrode pair signal E1-E2 and the second RF electrode pair signal E2-E3, respectively. However, no RF energy flow exists between the third electrode E3 and the first electrode E1, as represented by the 0 signal level in the third RF electrode pair signal E3-E1, during the first phase $\Phi_1$. This is due to the N periodic amplitude-modulated RF energy signals S1-S3 applied to the electrodes E1-E3 during the first phase $\Phi_1$. For example, referring to FIG. 4*b*, in the first phase $\Phi_1$, the modulated RF voltage signal is applied to the second electrode E2 as illustrated by the second periodic amplitude-modulated RF energy signal S2. However, a 0 voltage signal is applied to the first electrode E1 and third electrode E3, as illustrated by the first periodic amplitude-modulated RF energy signal S1 and the third periodic amplitude-modulated RF energy signal S3. Thus referring again to FIG. 4*c*, during the first phase $\Phi_1$, a voltage difference exists between the second electrode E2 and both the first electrode E1 and the third electrode E3. Therefore. RF energy flow occurs between these electrodes, as illustrated in the first RF electrode pair signal E1-E2 and the second RF electrode pair signal E2-E3. In some examples, this flow of RF energy may correspond to the magnitude of the RF voltage signal $V_{RF}$. However, during the first phase $\Phi_1$, as there is no voltage difference between the first electrode E1 and the third electrode E3, as the voltage applied to both of these electrodes is 0. Therefore, there is no RF energy flow between these electrodes, during the first phase $\Phi_1$, as illustrated in the third RF electrode pair signal E3-E1.

During the second and third phases $\Phi_{2-3}$, the N periodic amplitude-modulated RF energy signals S1-S3 change and as such the RF electrode pair signals E1-E2, E2-E3, E3-E1, change accordingly. As such, over the first, second and third phases $\Phi_{1-3}$, RF energy flows occurs between different ones of the electrodes E1-E3, which leads to more uniform heating of the skin in contact with the three electrodes E1-E3.

FIGS. 4*a*-*c* illustrate how an RF voltage signal can be amplitude modulated according to a dual state modulation waveform to apply phase shifted N periodic amplitude-modulated RF energy signals to N electrodes. However, in other examples, alternative modulation waveforms may be used to modulate the amplitude of an RF voltage signal or even bipolar RF voltage signals.

Figure 5C:
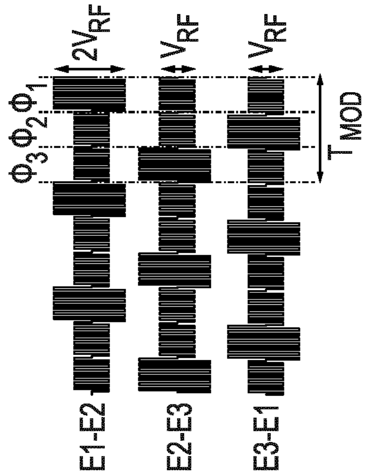
FIGS. 5*a-c* are examples of RF signals.
Figure 5B:
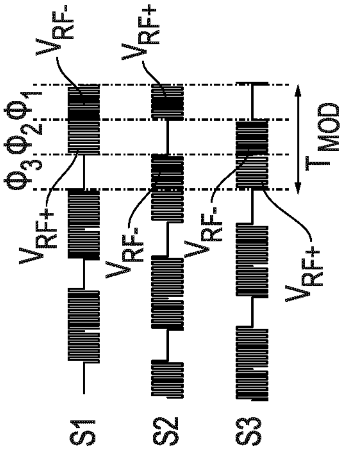
Figure 5A:
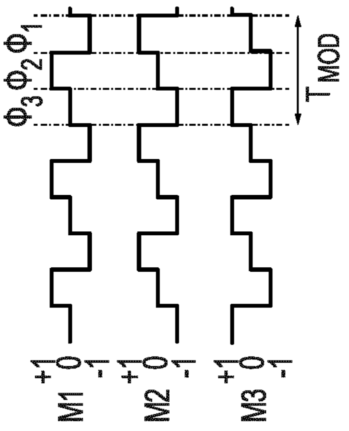

FIGS. 5*a*-*c* illustrate examples of RF signals applied to N electrodes. In the illustrated example of FIGS. 5*a*-*c*, N=3.

FIG. 5*a* illustrates three modulation signals M1, M2, M3, which are for modulating bipolar RF voltage signals $V_{RF+}$, $V_{RF-}$. The modulation signals M1-3 are again phase shifted from each other across three phases $\Phi_{1-3}$ over the modulation period $T_{MOD}$ according to the condition that an $n^{th}$ of the N modulation signals M1-M3 signals has a phase difference of $T_{MOD}$*(n−1)/N relative to a first of the N modulation signals M1-M3. In the illustrated example of FIG. 5*a*, the modulation signals M1-M3 each comprise an asymmetric triple state modulation waveform. The asymmetric triple state modulation waveform comprises a first state +1, a second state 0 and a third state −1.

In a similar manner to that described above in respect of FIGS. 4*a*-*c*, the N modulation signals M1-M3 comprising the asymmetric triple state modulation waveform signals of FIG. 5*a* may be applied to RF voltage signals to generate N periodic amplitude-modulated RF energy signals S1-S3. However, the additional third state −1 of the asymmetric triple state modulation waveform means that the N periodic amplitude-modulated RF energy signals S1-S3 can adopt an additional signal state. In such examples, the third state −1 may correspond to the N periodic amplitude-modulated RF energy signals S1-S3 adopting a negative RF voltage signal $V_{RF-}$, which is the inverse of a positive RF voltage signal $V_{RF+}$, which corresponds to the first state +1. The second state 0 may again correspond to a 0 voltage signal. In examples, according to the present disclosure, references to a "positive voltage signal" and a "negative voltage signal" may not refer to the polarity of the voltage signal, but rather that one is the inverse of the other.

FIG. 5*b* illustrates examples of first, second and third periodic amplitude-modulated RF voltage signals S1-S3, which in some examples may be referred to as N periodic amplitude-modulated RF energy signals S1-S3. The N periodic amplitude-modulated RF energy signals S1-S3 are applied to first, second and third electrodes E1-E3, respectively, according to the modulation signals M1-M3 of FIG. 5*a*. The first, second and third periodic amplitude-modulated RF energy signals S1-S3 are thus again phase shifted from one another over three phases $\Phi_{1-3}$ over the modulation period $T_{MOD}$ in a corresponding manner to the modulation signals M1-M3 of FIG. 5*a*.

As described above, the first modulation state +1 corresponds to a positive RF voltage signal $V_{RF+}$ and the third modulation state −1 corresponds to a negative RF voltage $V_{RF-}$. These two RF voltage signals may comprise the same basic RF frequency $f_{RF}$, but may be the inverse of each other. The second state 0 corresponds to a 0 voltage signal. Thus, the periodic amplitude-modulated RF energy signals S1-S3 comprise values of either the positive RF voltage signal $V_{RF+}$, the negative RF voltage $V_{RF-}$ or the 0 voltage signal depending on the state of the corresponding modulation signal M1-M3 during a given phase.

For example, referring to FIG. 5*a*, during the first phase $\Phi_1$, the first modulation signal M1 is at the third state −1, the second modulation signal M2 is at the first state +1 and the third modulation signal M3 is at the second state 0. Accordingly, referring to FIG. 5*b*, during the first phase $\Phi_1$, the first amplitude-modulated RF energy signal S1 comprises the negative RF voltage $V_{RF-}$, the second amplitude-modulated RF energy signal S2 comprises the positive RF voltage $V_{RF+}$ and the third amplitude-modulated RF energy signal S2 comprises the 0 voltage signal. During the second and third phases $\Phi_{2-3}$, the N periodic amplitude-modulated RF energy signals S1-S3 are thus output in a similar way depending on whether the corresponding modulation signal M1-M3 is at the first state +1, the second state 0 or the third state −1. In some examples, the modulation signals M1-M3 may thus represent the envelope of the N periodic amplitude-modulated RF energy signals S1-S3.

As illustrated in FIG. 5*b*, in some examples, the second states of the N periodic amplitude-modulated RF energy signals S1-S2 do not occur simultaneously. For example, over the three phases $\Phi_{1-3}$, within any one phase, no plurality of the N periodic amplitude-modulated RF energy signals S1-S3 comprise the 0 voltage signal, which in some examples may be referred to as the "first state" of the N periodic amplitude-modulated RF energy signals S1-S3.

FIG. 5*c* illustrates the RF electrode pair signals E1-E2, E2-E3, E3-E1, illustrating the flow of RF energy between electrodes E1-E3, in a similar manner to FIG. 4*c*, described above. In a similar manner to that descried above. RF energy flows between different ones of the electrodes E1-E3 and by different amounts over the three phases $\Phi_{1-3}$ according to the N periodic amplitude-modulated RF energy signals S1-S3 applied to the electrodes E1-E3 during any one phase. For example, during the first phase $\Phi_1$, a larger amount of RF energy flows between first electrode E1 and second electrode E2 compared to the flow of RF energy between the second electrode E2 and the third electrode E3 and between the third electrode E3 and the first electrode E1. This is represented in FIG. 5*c*, as the first RF electrode pair signal E1-E2 has a larger magnitude than the second and third RF electrode pair signals E2-E3, E3-E1. This is because, during the first phase $\Phi_1$, the negative RF voltage signal $V_{RF-}$ is applied to the first electrode E1 and the positive RF voltage signal $V_{RF+}$ is applied to the second electrode E2, whereas the 0 voltage signal is applied to the third electrode E3. Thus, during the first phase $\Phi_1$, there exists a voltage difference of $2V_{RF}$ between the first electrode E1 and second electrode E2. Whereas between the second electrode E2 and the third electrode E3, and between the third electrode E3 and the first electrode E1, there exists a voltage difference of $V_{RF}$. As such, during the first phase $\Phi_1$, the RF energy flow between the first electrode E1 and second electrode E2 is double that of the RF energy flow between the second electrode E2 and the third electrode E3 and between the third electrode E3 and the first electrode E1.

During the second and third phases $\Phi_{2-3}$, the N periodic amplitude-modulated RF energy signals S1-S3 change and as such the RF electrode pair signals E1-E2, E2-E3, E3-E1, change accordingly. As such, over the first, second and third phases $\Phi_{1-3}$, RF energy flow occurs between different ones of the electrodes E1-E3 and by differing amounts, which leads to more uniform heating of the skin in contact with the three electrodes E1-E3.

Figure 6C:
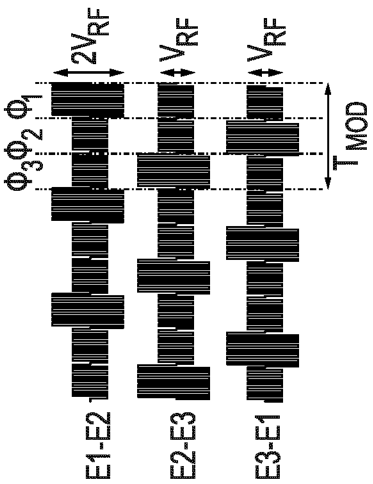
FIGS. 6*a-c* are examples of RF signals.
Figure 6B:
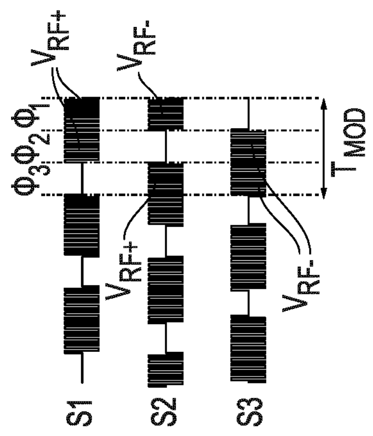
Figure 6A:
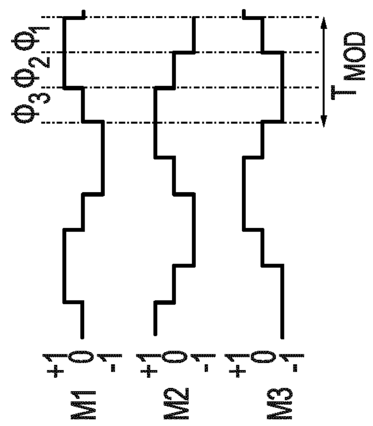

FIGS. 6*a-c* illustrate examples of RF signals applied to N electrodes. In the illustrated example of FIGS. 6*a-c*, N=3.

FIG. 6*a* illustrates three modulation signals M1, M2, M3, which in a similar manner to the modulation signals described above in FIG. 5*a*, are for modulating bipolar RF voltage signals $V_{RF+}$, $V_{RF-}$. The modulation signals M1-3 are again phase shifted from each other across three phases $\Phi_{1-3}$ over the modulation period $T_{MOD}$ according to the condition that an $n^{th}$ of the N modulation signals M1-M3 signals has a phase difference of $T_{MOD}$*(n−1)/N relative to a first of the N modulation signals M1-M3, where 2≤n≤N.

In the illustrated example of FIG. 6*a*, the modulation signals M1-M3 each comprise a symmetric triple state modulation waveform. The symmetric triple state modulation waveform comprises a first state +1, a second state 0 and a third state −1, which may again correspond to the positive RF voltage signal $V_{RF+}$ the 0 voltage signal and the negative RF voltage $V_{RF-}$, as described above with respect to FIGS. 5*a-c*. Thus, in a similar manner to that described above to FIGS. 5*a-c*, the three modulation signals M1, M2, M3 may be used to modulate bipolar RF voltage signals to generate three periodic amplitude-modulated RF signals S1-S3 for application to three respective electrodes E1-E3. The changing periodic amplitude-modulated RF signals S1-S3 over the three phases $\Phi_{1-3}$ thus result in changes in the RF energy flow between the three electrodes E1-E3, as illustrated by the RF electrode pair signals E1-E2, E2-E3, E3-E1 in FIG. 6*c*. As such, over the first, second and third phases $\Phi_{1-3}$, RF energy flows occurs between different ones of the electrodes E1-E3, which leads to more uniform heating of the skin in contact with the three electrodes E1-E3.

FIGS. 4*a-c*, 5*a-c* and 6*a-c* illustrate how RF voltage signals with a basic RF frequency $f_{RF}$ and RF period $T_{RF}$ can be amplitude modulated with modulation waveforms to generate N periodic amplitude-modulated RF signals with a modulation period substantially less than the RF period $T_{RF}$. As such, these N periodic amplitude-modulated RF signals can be phase shifted from one another without the use of bulky and costly RF phase steering devices. FIGS. 4*a-c*, 5*a-c* and 6*a-c* illustrate how said RF voltage signals can be modulated according to dual state, asymmetric triple state and symmetric triple state modulation waveforms. However, one skilled in the art will appreciate that other suitable modulation waveforms may be used to perform amplitude modulation of an RF voltage signal according to examples of the present disclosure.

Figure 7:
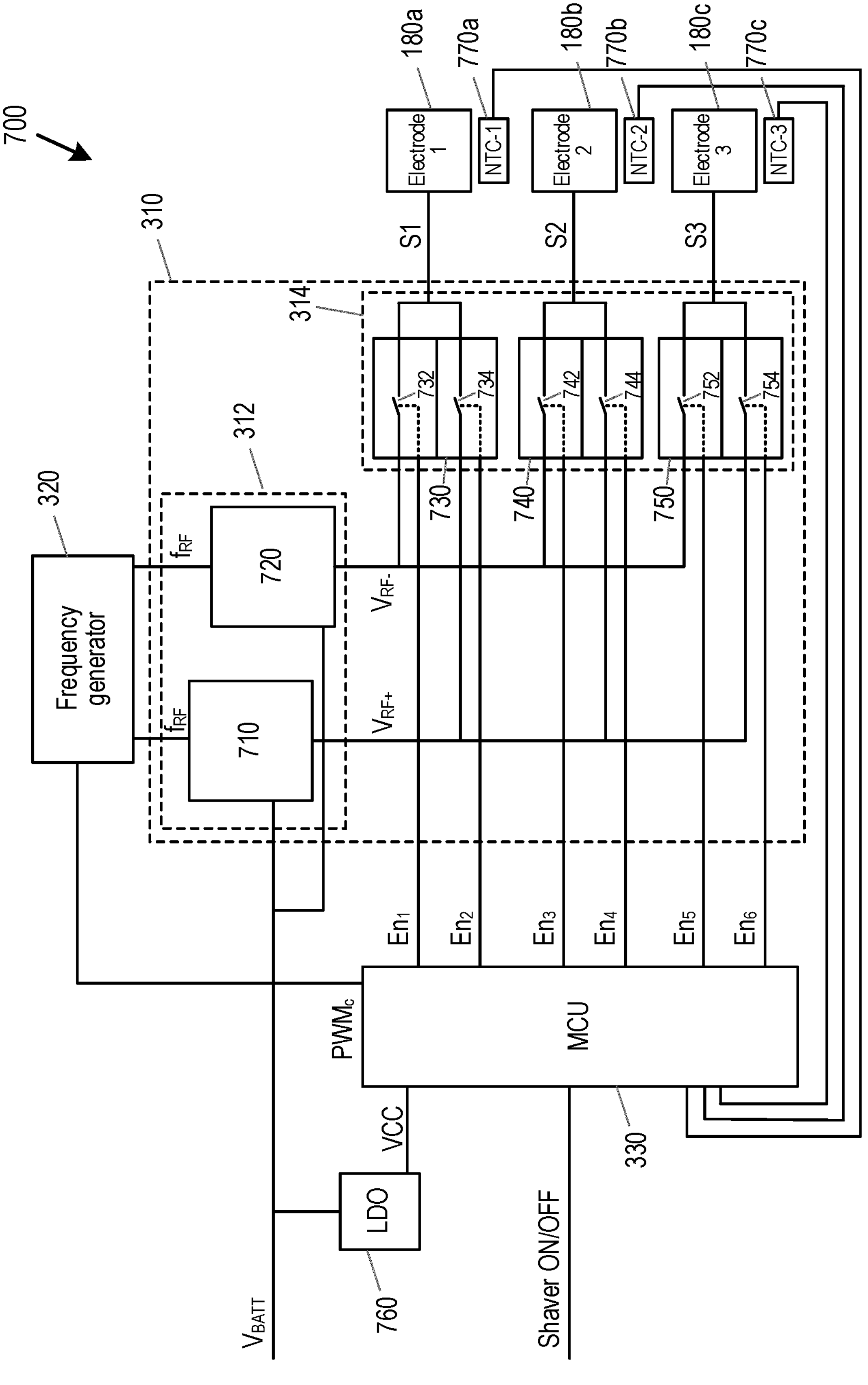
FIG. 7 is another example of circuitry for applying RF energy to electrodes.

FIG. 7 illustrates an example of circuitry 700. Circuitry 700 comprises elements in common with circuitry 300 described above, which are labelled with corresponding reference numerals and may operate in substantially the same way as described with respect to FIG. 3.

Circuitry 700 comprises a RF generator 320 configured to output a RF frequency signal $f_{RF}$. In some examples, the frequency of the RF frequency signal $f_{RF}$ may be in the range from 500 kHz to 10 MHz. The RF generator 320 may comprise an oscillator to generate the RF frequency signal $f_{RF}$. The oscillator may be implemented with or without a counter or divider. The frequency generator 320 may receive a PWM control signal $PWM_C$ from the microcontroller unit (MCU) 330 to control the frequency generator 320. For example, a variation in the duty cycle of the PWM control signal PWM may vary the frequency of the RF frequency signal $f_{RF}$. In some examples, the duty cycle of the PWM control signal $PWM_C$ may be from 0% to 100% and have a period of 1 to 10 ms. In other examples, the functionality of the frequency generator 320 may form part of the MCU 330, where the MCU 330 may directly output the RF frequency signal $f_{RF}$.

Circuitry 700 further comprises RF modulator 310, which further comprises converter unit 312 and switch module 314. Converter unit 312 is configured to receive the RF frequency signal $f_{RF}$ and convert the RF frequency signal $f_{RF}$ into bipolar RF voltage signals $V_{RF+}$, $V_{RF-}$. Converter unit 312 comprises a positive converter unit 710 and a negative converter unit 720. In some examples, the positive converter unit 710 and the negative converter unit 720 may each comprise a switched mode power supply, such as a boost converter. Positive converter unit 710 and negative converter unit 720 may thus each additionally be supplied with a battery voltage $V_{BATT}$. Positive converter unit 710 may thus be configured to convert the RF frequency signal $f_{RF}$ into a positive RF voltage signal $V_{RF+}$ and negative converter unit 720 may be configured to convert the RF frequency signal $f_{RF}$ into a negative RF voltage signal $V_{RF-}$. In examples according to the present disclosure, the terms positive RF voltage signal $V_{RF+}$ and negative RF voltage signal $V_{RF-}$ may not indicate the polarity of the signals, but rather indicate that each signal is an inverse of one another. For example, positive RF voltage signal $V_{RF+}$ and negative RF voltage signal $V_{RF-}$ may each comprise a PWM RF voltage signal both oscillating at the frequency RF frequency signal $f_{RF}$, but where one is phase shifted from the other by 180°. In some examples, the positive RF voltage signal $V_{RF+}$ and negative RF voltage signal $V_{RF-}$ may each comprise a peak-to-peak voltage of between 10 V and 100 V. In one example, the positive converter unit 710 and the negative converter unit 720 may each comprise a switched mode power supply, where the output of each of the positive converter unit 710 and the negative converter unit 720 is modulated by the RF frequency signal $f_{RF}$ to generate the PWM positive RF voltage signal $V_{RF+}$ and the PWM negative RF voltage signal $V_{RF-}$, respectively.

Circuitry 700 further comprises a switch module 314, which comprises a plurality of switch units 730, 740, 750. Each of the plurality of switch units 730, 740, 750 comprises a respective pair of switches. First switch unit 730 comprises first switch 732 and second switch 734. Second switch unit 740 comprises third switch 742 and fourth switch 744. Third switch unit 750 comprises fifth switch 752 and sixth switch 754.

Switch module 314 is configured to receive the positive RF voltage signal $V_{RF+}$ and the negative RF voltage signal $V_{RF-}$ and output the N periodic amplitude-modulated RF signals S1, S2, S3 to the N electrodes 180*a-c*. In the illustrated example of FIG. 7, N=3.

MCU 330 is thus configured to output control signals $En_{1-6}$ to control switches 732-754 of the switch units 730, 740, 750, in order to modulate the amplitude of the positive RF voltage signal $V_{RF+}$ and the negative RF voltage signal $V_{RF}$ to generate the N periodic amplitude-modulated RF signals S1-S3.

As described above with respect to FIGS. 5*a-c* and 6*a-c*, over a plurality of phases $\Phi_{1-3}$, the N periodic amplitude-modulated RF signals S1-S3 may transition between three values depending on the modulation waveforms used to generate the N periodic amplitude-modulated RF signals S1-S3. In some examples, the three values may thus comprise the positive RF voltage signal $V_{RF+}$ a 0 voltage signal and the negative RF voltage signal $V_{RF-}$. MCU 330 may thus be configured to control operation of the switches 732-754 of the switch units 730, 740, 750, such that the N periodic amplitude-modulated RF signals S1-S3, are output to the electrodes 180$a$-$c$ at one of the three values: positive RF voltage signal $V_{RF+}$, a 0 voltage signal and the negative RF voltage signal $V_{RF}$.

For example, referring briefly to FIG. 5$b$, in a first phase $\Phi_1$, first periodic amplitude-modulated RF signal S1 comprises the negative RF voltage signal $V_{RF-}$, second periodic amplitude-modulated RF signal S2 comprises the positive RF voltage signal $V_{RF+}$ and third periodic amplitude-modulated RF signal S3 comprises the 0 voltage signal. Thus, referring again to FIG. 7, MCU 330 may output the control signals $En_{1-6}$ to control the switches 732-754 of the switch units 730, 740, 750, in order to output the N periodic amplitude-modulated RF signals S1-S3 with the values as outlined in the first phase $\Phi_1$ of FIG. 5$b$.

For example, to output first periodic amplitude-modulated RF signal S1 at the negative RF voltage signal $V_{RF-}$, MCU 330 may thus output the first control signal $En_1$ to active the first switch 732 to connect the first electrode 180$a$ to the output of the negative converter unit 720. MCU 330 may thus additionally output the second control signal $En_2$ to deactivate the second switch 734 such that the first electrode 180$a$ is not connected to the output of the positive converter unit 710.

To output second periodic amplitude-modulated RF signal S2 at the positive RF voltage signal $V_{RF+}$, MCU 330 may thus output the fourth control signal $En_4$ to activate the fourth switch 744 to connect the second electrode 180$b$ to the output of the positive converter unit 710. MCU 330 may thus additionally output the third control signal $En_3$ to deactivate the third switch 742 such that the second electrode 180$b$ is not connected to the output of the negative converter unit 720.

To output the third periodic amplitude-modulated RF signal S3 at the 0 voltage signal, MCU 330 may thus output the fifth control signal $En_5$ and the sixth control signal $En_6$ to deactivate the fifth switch 752 and the sixth switch 754, respectively. The node between the third switch unit 750 and the third electrode 180$c$ may thus be floating, such that no voltage signal or a 0 voltage signal is applied to the third electrode 180$c$ during the first phase $\Phi_1$ of FIG. 5$b$.

Thus, by appropriate control of the switches 732-754 of the switch units 730, 740, 750, the MCU 330 is configured to vary the N periodic amplitude-modulated RF signals S1-S3 over each of a plurality of phases $\Phi_{1-3}$ according to examples of the present disclosure. The electrodes 180$a$-$c$ are thus configured to receive the N periodic amplitude-modulated RF signals S1-S3, where RF energy may flow between the electrodes 180$a$-$c$, through the skin of a user, over the plurality of phases $\Phi_{1-3}$ to cause heating of the skin.

Circuitry 700 further comprises low dropout regulator (LDO) 760. LDO 760 is configured to regulate the battery voltage $V_{BATT}$ when the battery voltage $V_{BATT}$ decreases to low levels.

Circuitry 700 further comprises a plurality of sense resistors 770$a$-$c$ comprising first sense resistor 770$a$, second sense resistor 770$b$ and third sense resistor 770$c$. First, second and third sense resistors 770$a$-$c$ may each be arranged proximate to the first, second and third electrodes 180$a$-$c$, respectively. The plurality of sense resistors 770$a$-$c$ are thus configured to measure the temperature of at a surface of a respective electrode 180$a$-$c$ and the skin that is in contact with the electrode surface. In the illustrated example of FIG. 7, each of the plurality of sense resistors 770$a$-$c$ comprise a negative temperature coefficient (NTC) resistor. In one example, each of the plurality of sense resistors 770$a$-$c$ may form part of a voltage divider. The plurality of sense resistors 770$a$-$c$ may thus be connected to the MCU 330, where the value of the voltage across each of the sense resistors 770$a$-$c$ may be used as safety control elements. In one example, in response to the temperature of any one of the plurality of sense resistors 770$a$-$c$ increasing above a threshold. MCU may be configured to vary the PWM control signal $PWM_C$ to reduce the RF frequency signal $f_{RF}$ to reduce the temperature applied to the skin of a user.

Figure 8A:
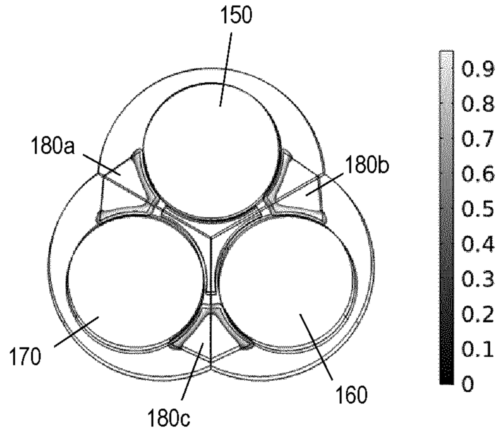
FIGS. 8*a* and 8*b* are examples of RF energy applied to electrodes of an electric shaver.
Figure 8B:
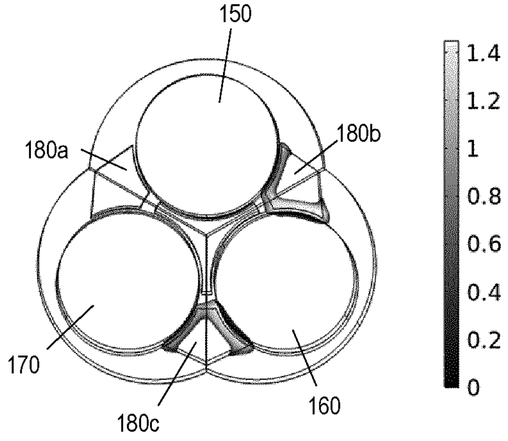

FIGS. 8$a$ and 8$b$ illustrate results of simulations of RF heating of a skin surface in contact with electrodes 180$a$-$c$ arranged in the cutting head of an electric shaver.

FIG. 8$a$ illustrates the results obtained with an electric shaver according to examples of the present disclosure, where N periodic amplitude-modulated RF energy signals are applied to the electrodes 180$a$-$c$. The skin surface of the user was heated to 41.7° C. over 5 seconds. As illustrated, RF energy flow occurs between each of the electrodes 180$a$-$c$. Furthermore, as illustrated, the skin depth penetration is about 0.9 mm between each of the electrodes 180$a$-$c$. As skin heating penetration is the same between each of the electrodes, this results in more uniform heating of the skin in contact with the electrodes 180$a$-$c$ in the cutting head of an electric shaver.

FIG. 8$b$ illustrates the results obtained with an electric shaver where a single phase of RF energy is applied to the electrodes 180$a$-$c$. First electrode 180$a$ received a 0 voltage signal, second electrode 180$b$ received a positive RF voltage signal $V_{RF+}$ and third electrode 180$c$ received a negative RF voltage signal $V_{RF-}$. The skin of the user was heated to 45.3° C. over 5 seconds. Whilst the temperature heating is higher than the heating caused by the electric shaver according to examples of the present disclosure illustrated in FIG. 8$a$, the RF energy flow with the shaver illustrated in FIG. 8$b$ is less homogeneous. As illustrated, substantial RF energy flow occurs between second electrode 180$b$ and third electrode 180$c$. However, there is reduced RF energy flow between the first electrode 180$a$ and both the second electrode 180$b$ and the third electrode 180$c$. The skin heating penetration between the second electrode 180$b$ and third electrode 180$c$ is also high as a penetration of 1.4 mm occurs between these electrodes, whereas a penetration of about 0.5 occurs between the first electrode 180$a$ and both the second electrode 180$b$ and the third electrode 180$c$. The uneven RF energy flow and skin penetration creates the feeling of hotspots in the skin of a user, which are unpleasant. The electric shaver according to the examples of the present disclosure illustrated in FIG. 8$a$ heated a larger area of the skin by 13% and did not generate any hotspots.

Examples according to the present disclosure have been described where electrodes may be arranged in the skin-contacting area of an electric shaver, which are adjacent to the hair cutting units of the electric shaver in a lateral portion of the skin-contacting area between respective pairs of the hair-cutting units. However, as described below, other arrangements of the hair-cutting units and the electrodes are possible.

Figure 9:
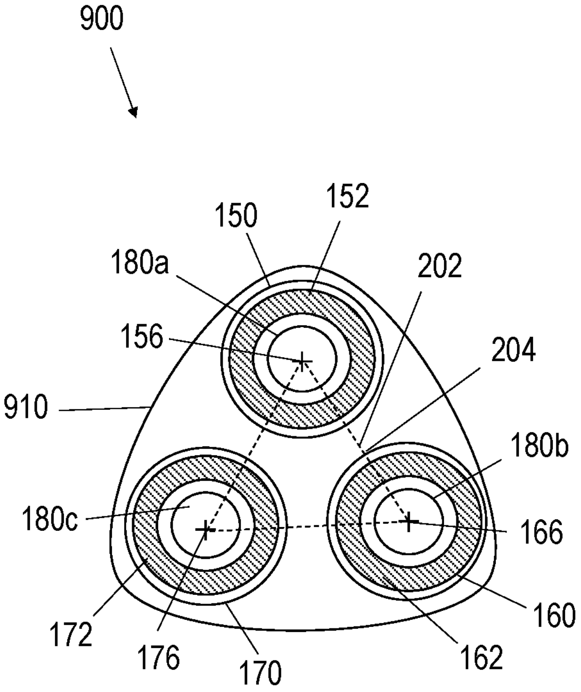
FIG. 9 is another example of a cutting head of an electric shaver.

FIG. 9 illustrates another example of a skin-contacting area 910 of electric shaver 900. Electric shaver 900 comprises elements in common with the skin-contacting area 200 of the electric shaver described above with respect to FIG. 2, which are labelled with corresponding reference numerals and in substantially the same way as described above.

Electric shaver 900 thus comprises first, second and third cutting units 150, 160, 170. First, second and third cutting units 150, 160, 170 each comprise a respective covering element in the form of first, second and third electrodes 180*a-c*. In such examples, the first, second and third electrodes 180*a-c* are arranged on the first, second and third external cutting members 152, 162, 172, respectively in a substantially corresponding manner to the first, second and third covering elements 154, 164, 174, described above with respect to FIG. 1. The first, second and third covering elements may thus be formed of an electrically conductive material for conducting an RF voltage signal. An RF generator unit configured to output the N periodic amplitude-modulated RF signals, as described above, may thus be electrically connected to each of the electrodes 180*a-c*. In use, N periodic amplitude-modulated RF signals may thus be applied to the electrodes 180*a-c* in a corresponding manner to that described above. As such, in use, RF energy may flow between the electrodes 180*a-c* within the skin of the user to warm the skin.

The first, second and third electrodes 180*a-c* may thus be electrically isolated from the other elements of the skin-contacting area 910 so that a 'circuit' for the RF voltages is only completed when the electrodes 180*a-c* are applied to the skin of a user. For example, each of the electrodes 180*a-c* may be electrically isolated from their respective external cutting members 152, 162, 172 by separating the two elements with an isolating material, such as a non-conducting plastic.

Due to the arrangement of the electrodes 180*a-c* in the electric shaver 900, the geometric center point of each hair cutting unit 150, 160, 170 is thus aligned with the geometric center point of each of the electrodes 180*a-c*. The first pitch distance 202 between the geometric center points 156, 166, 176 of each pair of the hair-cutting units 150, 160, 170, is thus the same as the second pitch distance 204 between the geometric center points of each pair of the electrodes 180*a-c*. In the example of electric shaver 900, the ratio between the second minimum pitch distance 204 and the first minimum pitch distance 202 may thus be 1. As such, the electrodes 180*a-c* are again distributed across a major area of the skin-contacting area 910 and as such, this arrangement may result in more uniform heating in a large area of the skin in contact with the skin-contacting area 910, in use. For example, due to the arrangement of the N electrodes 180*a-c*, RF energy may flow between each of the N electrodes 180*a-c*, such that a majority of the skin in contact with the skin-contacting area 200 is warmed by the application of the RF energy.

The examples presented thus far have described the teachings of the present disclosure in relation to a rotary shaver. However, the teachings of the present disclosure may additionally be applied to other forms of electric shavers, for example foil shavers.

Figure 10:
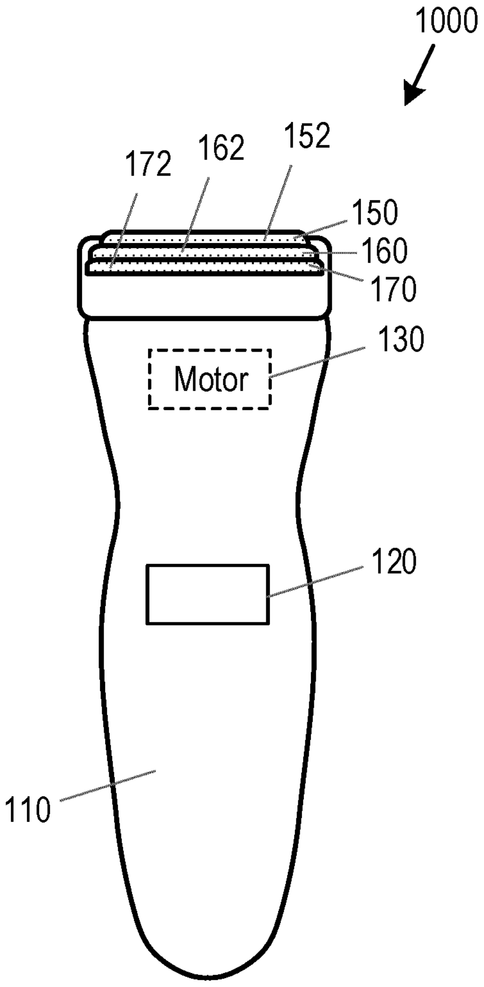
FIG. 10 is another example of an electric shaver.

FIG. 10 illustrates an example of an electric shaver 1000. Electric shaver comprises elements in common with electric shaver 100 described above, which are labelled with corresponding reference numerals and may operate in substantially the same way as described above.

Electric shaver 1000 is in the form of a foil shaver. As such, cutting head 140 comprises first, second and third hair cutting units 150, 160, 170. Each hair-cutting unit 150, 160, 170 comprises a respective internal cutting member, such as a blade, and a respective external cutting member 152, 162, 172 that comprises a plurality of hair-entry openings. The hair-entry openings may comprise holes and/or lamellae. Each external cutting member 152, 162, 172 comprises a respective skin-contacting area that contacts the skin of the user when the shaver 1000 is in use. The hair-entry openings are part of the skin-contacting area. In the embodiment of FIG. 10, each external cutting member 152, 162, 172 is a shaving foil extending parallel to a longitudinal direction. The external cutting member 152, 162, 172 is arranged to cover the respective internal cutting member and the respective internal cutting member is movable relative to the external cutting member, for example, the blade may reciprocate linearly parallel to the longitudinal direction relative to the foil. Hairs may protrude through the openings of the foil 152, 162, 172 and the reciprocating action of the blade cuts the hairs, where the cut ends may collect in a hair collecting area of the shaver 1000. The electric shaver 1000 thus further comprises motor 130 configured to move the internal cutting members relative to the respective external cutting members 152, 162, 172 to effect the cutting action.

The RF generator energy unit 120 is configured to apply the N periodic amplitude-modulated RF signals to the skin via the skin-contacting area provided by the external cutting members 152, 162, 172 of each of the hair-cutting units 150, 160, 170. For example, each of the external cutting members 152, 162, 172 of each of the hair-cutting units 150, 160, 170 may be formed of an electrically conductive material that is able to conduct the N periodic amplitude-modulated RF signal but is also bio-compatible with skin, for example, a metal, such as stainless steel, silver or silver-chloride. As such, the entirety of the external cutting members 152, 162, 172 is configured to conduct the N periodic amplitude-modulated RF signals. In other words, the external cutting members 152, 162, 172 act as the N electrodes for applying the N periodic amplitude-modulated RF signals to the skin of a user to warm the skin. Each of the N electrodes may thus be constituted by at least a skin-contacting portion of the external cutting member 152, 162, 172 of a respective one of the N hair-cutting units 150, 160, 170. Each of the external cutting members 152, 162, 172 may thus additionally be electrically isolated from one another with the electric shaver 1100. For example, a gap may exist between each of the external cutting members 152, 162, 172, to eclectically isolate the external cutting members 152, 162, 172 from each other. In this way, a 'circuit' may be formed between the external cutting members 152, 162, 172 when they are put in contact with the skin of a user.

Figure 11:
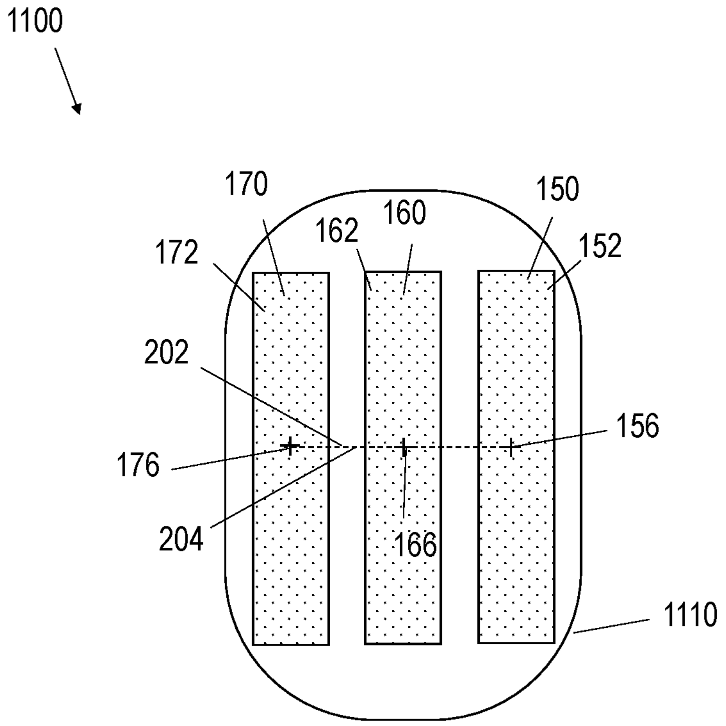
FIG. 11 is another example of a cutting head of an electric shaver.

FIG. 11 illustrates another example of an electric shaver 1100. Electric shaver 1100 comprises elements in common with electric shaver 1000 described above, which are labelled with corresponding reference numerals and may operate in substantially the same way as described above.

Electric shaver 1100 comprises a skin-contacting area 1110 comprising first second and hair cutting units 150, 160, 170. As described above, the external cutting members 152, 162, 172 act as the N electrodes for applying the N periodic amplitude-modulated RF signals to the skin of a user to warm the skin. In the arrangement of electric shaver 1100, the geometric center points 156, 166, 176 of each of the hair cutting units 150, 160, 170 is thus aligned with the geometric center point of each of the electrodes. The first pitch distance 202 between the geometric center points 156, 166, 176 of each pair of the hair-cutting units 150, 160, 170, is thus the same as the second pitch distance 204 between the geometric center points of each pair of the electrodes. In the example of electric shaver 1100, the ratio between the second minimum pitch distance 204 and the first minimum pitch distance 202 may thus be 1. As such, the electrodes 180*a-c* are again distributed across a major area of the skin-contacting area 1110 and as such, this arrangement may result in more uniform heating in a large area of the skin in contact with the skin-contacting area 1110, in use. For example, due to the arrangement of the external cutting members 152, 162, 172 acting as the N electrodes, RF energy may flow between each of the N electrodes, such that a majority of the skin in contact with the skin-contacting area 1110 is warmed by the application of the RF energy.

Figure 12B:
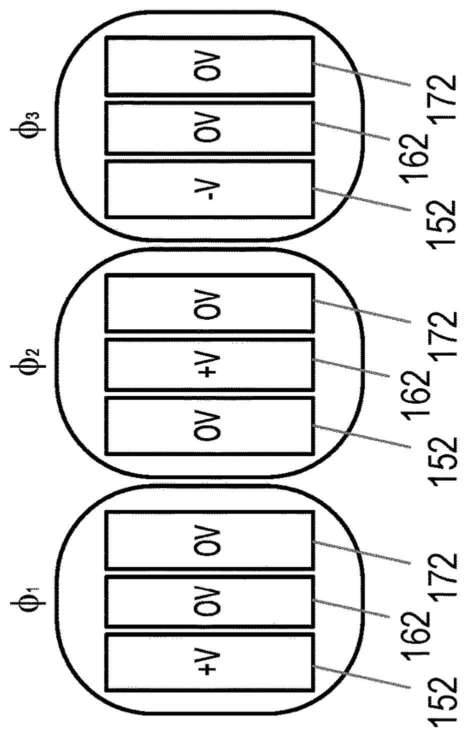
FIGS. 12*a* and 12*b* are examples of RF energy applied to electrodes of an electric shaver.
Figure 12A:
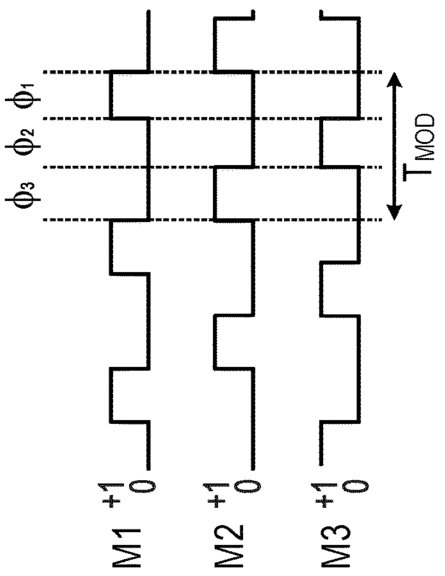

FIGS. 12*a* and 12*b* illustrate examples of how RF signals may be applied to the external cutting members 152, 162, 172 of hair cutting units 150, 160, 170 of the foil shaver variety.

FIG. 12*a* illustrates N modulation signals M1-M3, where N=3. The N modulation waveforms M1-M3 thus comprise a first modulation signal M1 for modulating the RF voltage signals $V_{RF}$ applied to a first electrode, a second modulation signal M2 for modulating the RF voltage signal $V_{RF}$ applied to a second electrode and a third modulation signal M3 for modulating the RF voltage signal $V_{RF}$ applied to a third electrode. As illustrated in FIG. 12*b*, the first second and third electrodes comprise the first, second and third external cutting members 152, 162, 172 of an electric shaver.

The N modulation signals M1-M3 each comprise a dual state modulation waveform comprising a first state +1 and a second state 0. As described above with respect to FIGS. 4*a-c*, the dual state N modulation signals M1-M3 are phase shifted from each other across three phases $\Phi_{1-3}$ over the modulation period $T_{MOD}$ according to the condition that an $n^{th}$ of the N modulation signals M1-M3 signals has a phase difference of $T_{MOD}$*(n−1)/N relative to a first of the N modulation signals M1-M3, where 2≤n≤N. As such, in a similar manner to that described above with respect to FIGS. 4*a-c*, the N modulation signals M1-M3 may be used to modulate the amplitude of a RF voltage signal $V_{RF}$ to generate N periodic amplitude-modulated RF energy signals for application to N electrodes.

FIG. 12*b* illustrates how N periodic amplitude-modulated RF voltage signals, which in some examples may be referred to as N periodic amplitude-modulated RF energy signals, are applied to the external cutting members 152, 162, 172 of an electric shaver over the three phases $\Phi_{1-3}$. In a similar manner to that described above with respect to FIGS. 4*a-c*, the N periodic amplitude-modulated RF energy signals may comprise a first value of the RF voltage signal +V or a second value of a zero voltage signal 0V, depending on the state of the corresponding N modulation signal M1-M3 during a given phase. For example, referring to FIG. 12*a*, during the first phase $\Phi_1$, the first modulation signal M1 is at the first state +1 and both the second modulation signal M2 and the third modulation signal M3 are at the second state 0. Thus, referring to FIG. 12*b*, during the first phase $\Phi_1$, the first external cutting member 152 receives a first periodic amplitude-modulated signal at the RF voltage signal +V and both the second external cutting 162 and the second external cutting member 172 respectively receive a second and third periodic amplitude-modulated signal at the zero voltage signal 0V. RF energy flow may thus occur between the first external cutting member 152 and both of the second external cutting 162 and the second external cutting member 172 to warm the skin of a user.

In a similar manner to that described above with respect to FIGS. 4*a-c*, during the second and third phases $\Phi_{2-3}$, the N periodic amplitude-modulated RF energy signals change, depending on the N modulation signals M1-M3, and as such the RF energy flow between the external cutting members 152, 162, 172, changes accordingly. In some examples, the modulation signals M1-M3 may thus represent the envelope of the N periodic amplitude-modulated RF energy signals. As such, over the first, second and third phases $\Phi_{1-3}$, RF energy flows occurs between different ones of the external cutting members 152, 162, 172, which leads to more uniform heating of the skin in contact with the external cutting members 152, 162, 172.

A simulation was performed measuring heating of skin with an electric shaver using the modulation signals M1-M3 according to FIGS. 12*a-b*. These heating results were compared to a simulation of skin heating with an electric shaver comprising three shaver foil electrodes, to which unmodulated RF signals were applied. The electric shaver using the modulation signals M1-M3 according to FIGS. 12*a-b* heated a larger volume of skin by 25% compared to the electric shaver with the unmodulated RF signals. In said examples, for both shavers, the two foil electrodes located at the side of the configuration e.g. first external cutting member 152 and third external cutting member 172, comprised a skin-contacting area of 4×25 mm and the central foil electrode e.g. second external cutting member 162 comprised a skin-contacting area of 5×25 mm, where each foil electrode is separated by an electrically isolating gap of 4 mm. The electric shaver using the modulation signals M1-M3 used a peak-to-peak voltage magnitude of 11.V, whereas the electric shaver with the unmodulated RF signals used a voltage magnitude of 19 V.

Figure 13B:
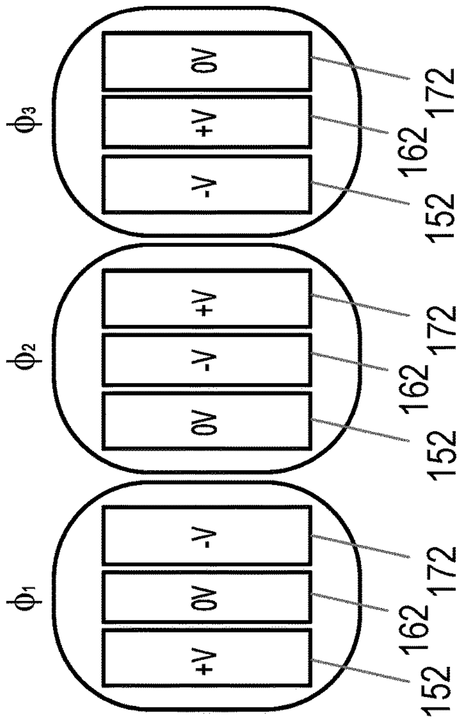
FIGS. 13*a* and 13*b* are further examples of RF energy applied to electrodes of an electric shaver.
Figure 13A:
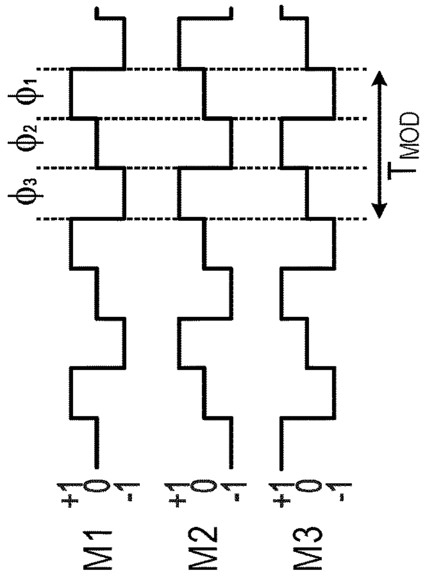

FIGS. 13*a* and 13*b* illustrate another example of how RF signals may be applied to the external cutting members 152, 162, 172 of hair cutting units 150, 160, 170 of a foil shaver.

FIG. 13*a* illustrates N modulation signals M1-M3, where N=3. In a similar manner to that described above with respect to FIGS. 12*a-b*, the N modulation signals M1-M3 may be used to modulate the amplitude of a RF voltage signal $V_{RF}$ to generate N periodic amplitude-modulated RF energy signals for application to N electrodes. As illustrated in FIG. 13*b*, the N electrodes comprise the first, second and third external cutting members 152, 162, 172 of an electric shaver.

Referring again the FIG. 13*a*, the N modulation signals M1-M3 each comprise an asymmetric triple state modulation waveform. In a similar manner to that described above with respect to FIGS. 5*a-c*, the N modulation signals M1-M3 of FIG. 13*a* are phase shifted from each other across three phases $\Phi_{1-3}$ over the modulation period $T_{MOD}$ according to the condition that an $n^{th}$ of the N modulation signals M1-M3 signals has a phase difference of $T_{MOD}$*(n−1)/N relative to a first of the N modulation signals M1-M3, where 2≤n≤N. As such, in a similar manner to that described above with respect to FIGS. 5*a-c*, the N modulation signals M1-M3 may be used to modulate the amplitude of a positive RF voltage signal +V and a negative RF voltage signal −V to generate N periodic amplitude-modulated RF energy signals for application to N electrodes.

Referring to FIG. 13*b*, the N periodic amplitude-modulated RF voltage signals, which in some examples may be referred to as N periodic amplitude-modulated RF energy signals S1-S3, may thus be applied to the first, second and third external cutting members 152, 162, 172 of an electric shaver across the three phases $\Phi_{1-3}$. Thus, as described above with respect to FIGS. 5*a-c*, over the first, second and third phases $\Phi_{1-3}$, RF energy flows occurs between different ones of the external cutting members 152, 162, 172 and by differing amounts, which leads to more uniform heating of the skin in contact with the three electrodes E1-E3.

Examples according to the present disclosure have thus been presented where N=3 in respect of the N electrodes and N periodic amplitude-modulated RF energy signals. However, in other examples, N may be greater than 3, for example, N=4.

Figure 14:
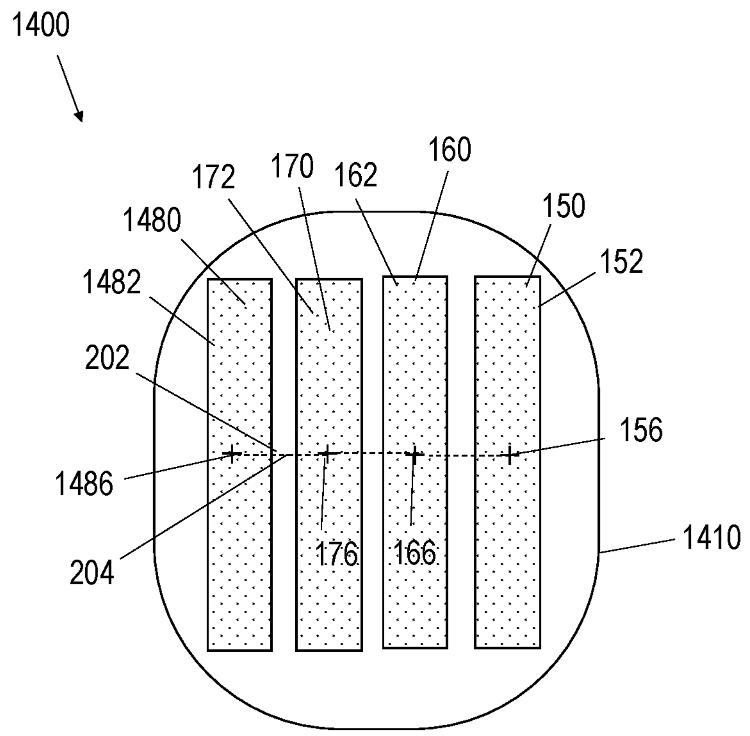
FIG. 14 is another example of a cutting head of an electric shaver.

FIG. 14 illustrates an example of an electric shaver 1400. Electric shaver 1400 comprises elements in common with electric shaver 1100 described above, which are labelled with corresponding reference numerals and may operate in substantially the same way as described above.

Electric shaver 1400 comprises a skin-contacting area 1410 comprising first, second and third hair cutting units 150, 160, 170, and additionally a fourth hair cutting unit 1480. Fourth hair cutting unit 1480 additionally comprises a fourth external cutting member 1480 of the shaver foil variety. Fourth hair cutting unit 1480 and fourth external cutting member 1480 may thus operate in a substantially corresponding way to hair cutting units 150, 160, 170 and external cutting members 152, 162, 172, described above with respect to FIG. 11. Fourth external cutting member 1480 may thus be formed of an electrically conductive material that is able to conduct a fourth of the N periodic amplitude-modulated RF signal. As such, the entirety of the fourth external cutting member 1482 is configured to conduct the fourth of the N periodic amplitude-modulated RF signals. In other words, the fourth external cutting member 1480 acts as a fourth electrode for applying the a fourth of the N periodic amplitude-modulated RF signals to the skin of a user to warm the skin.

As described above, the external cutting members 152, 162, 172, 1482 act as the N electrodes for applying the N periodic amplitude-modulated RF signals to the skin of a user to warm the skin. Due to the arrangement of electric shaver 1400, the geometric center points 156, 166, 176, 1486 of each of the hair cutting units 150, 160, 170, 1480 is thus aligned with the geometric center point of each of the electrodes. The first pitch distance 202 between the geometric center points 156, 166, 176 of each pair of the hair-cutting units 150, 160, 170, is thus the same as the second pitch distance 204 between the geometric center points of each pair of the electrodes 180*a-c*. In the example of electric shaver 1400, the ratio between the second minimum pitch distance 204 and the first minimum pitch distance 202 may thus be 1. As such, the electrodes are again distributed across a major area of the skin-contacting area 1110 and as such, this arrangement may result in more uniform heating in a large area of the skin in contact with the skin-contacting area 1110, in use.

Figure 15A:
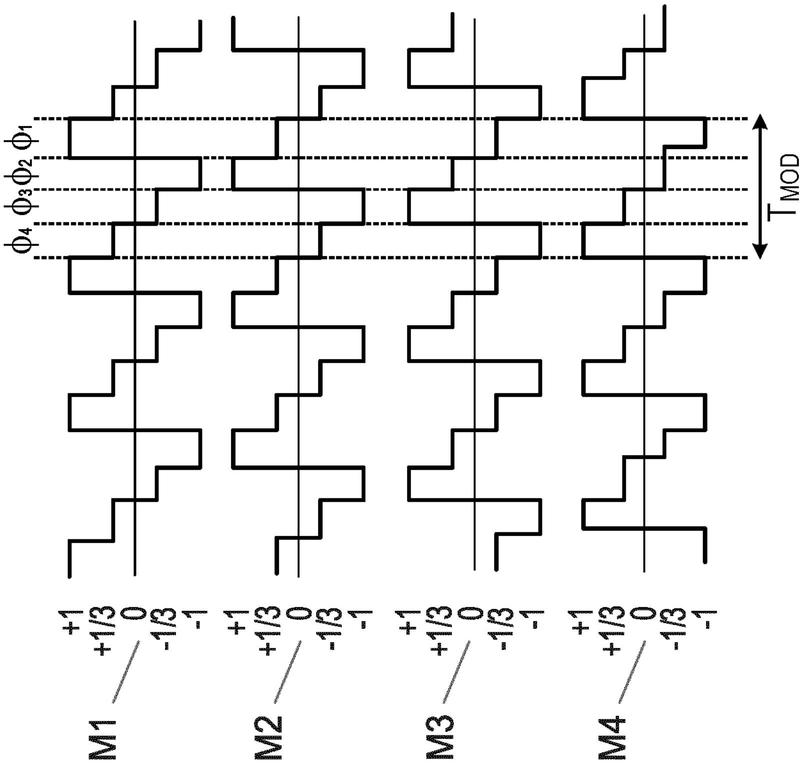
FIGS. 15*a* and 15*b* is another example of RF energy applied to electrodes of an electric shaver.
Figure 15B:
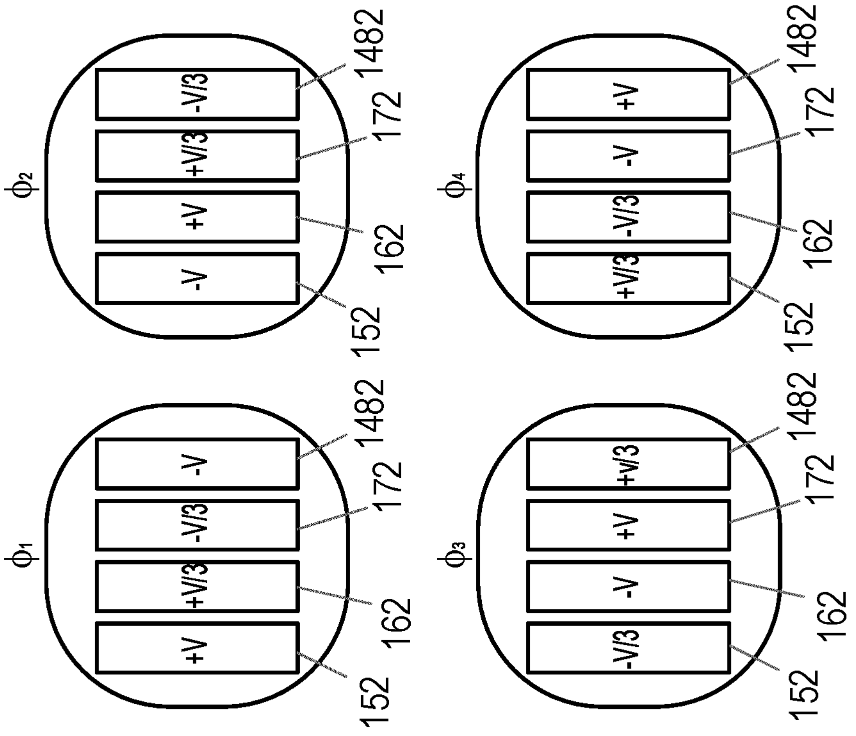

FIGS. 15*a* and 15*b* illustrate examples of how RF signals may be applied to the external cutting members 152, 162, 172, 1482 of hair cutting units 150, 160, 170, 1480 of a foil shaver.

FIG. 15*a* illustrates N modulation signals M1-M4, where N=4. The N modulation waveforms M1-M4 comprise a first modulation signal M1 for modulating RF voltage signals $V_{RF}$ applied to a first electrode, a second modulation signal M2 for modulating RF voltage signals $V_{RF}$ applied to a second electrode, a third modulation signal M3 for modulating RF voltage signals $V_{RF}$ applied to a third electrode and a fourth modulation signal M4 for modulating RF voltage signals $V_{RF}$ applied to a fourth electrode. As illustrated in FIG. 15*b*, the first, second, third and fourth electrodes comprise the first, second, third and fourth external cutting members 152, 162, 172, 1482 of an electric shaver.

The N modulation signals M1-M4 each comprise an asymmetric quadruple state modulation signal comprising a first state +1, a second state +⅓, a third state −⅓ and a fourth state −1. Each of the N modulation signals M1, M2, M3, M4 has a modulation period $T_{MOD}$, which may be divided into four phases $\Phi_{1-4}$. Thus, in a similar manner to that described above, with respect to FIGS. 4*a-c*, 5*a-c*, 6*a-c*, 12*a-c* and 13*a-c*, the N modulation signals M1-M4 are phase shifted from each other across four phases $\Phi_{1-4}$ over the modulation period $T_{MOD}$ according to the condition that an $n^{th}$ of the N modulation signals M1-M4 signals has a phase difference of $T_{MOD}*(n-1)/N$ relative to a first of the N modulation signals M1-M4 where 2≤n≤N.

FIG. 15*b* illustrates how the N periodic amplitude-modulated RF voltage signals, which in some examples may be referred to as N periodic amplitude-modulated RF energy signals S1-S3, are applied to the external cutting members 152, 162, 172, 1482 of an electric shaver over the four phases $\Phi_{1-4}$. In a similar manner to that described above, the N periodic amplitude-modulated RF energy signals may comprise a plurality of values, which comprise a first value of the RF voltage signal +V, a second value of RF voltage signal +V/3, a third voltage signal of RF voltage signal −V/3 and a fourth value of RF voltage signal −V, depending on the state of the corresponding N modulation signal M1-M4 during a given phase. In some examples, the modulation signals M1-M3 may thus represent the envelope of the N periodic amplitude-modulated RF energy signals S1-S3.

In some examples, to generate the second voltage value of +V/3 and the third voltage value of −V/3. RF generator unit 312 described above may comprise additional converter units for generating the RF voltage signals $+V_{RF}/3$ and $-V_{RF}/3$. In such examples, switch unit 314 may thus further comprise additional switches to apply the second voltage value of +V/3 and the third voltage value of −V/3 to the N electrodes.

In the illustrated example of FIGS. 15*a-c*, the ratio between magnitude of the first and fourth voltage values +V, −V and the second and third voltage values +V/3, −V/3 is 0.33. However, in other examples a ratio between these voltage magnitude may be between 0.25 and 0.5, preferably between 0.3 and 0.35.

Referring to FIG. 15*a*, during the first phase $\Phi_1$, the first modulation signal M1 is at the first state +1, the second modulation signal M2 is at the second state +⅓, the third modulation signal M3 is at the third state −⅓ and the fourth modulation signal M4 is at the fourth state −1. Thus, referring to FIG. 15*b*, during the first phase $\Phi_1$, the first external cutting member 152 receives a first periodic amplitude-modulated signal at the first value +V, the second external cutting 162 receives a second periodic amplitude-modulated signal at the second value +V/3, the third external cutting 172 receives a third periodic amplitude-modulated signal at the third value −V/3 and the fourth external cutting member 1482 receives a fourth periodic amplitude-modulated signal at the fourth value −V. Thus, in a similar manner to that described above, due to the voltage differences that exist between the external cutting members 152, 162, 172, 1482 of an electric shaver during the first phase $\Phi_1$, RF energy flow may thus occur between the external cutting members 152, 162, 172, 1482 to warm the skin of a user.

In a similar manner to that described above, during the second, third and fourth phases $\Phi_{2-4}$, the N periodic amplitude-modulated RF energy signals change, based on the N modulation signals M1-M4, and as such the RF energy flow between the external cutting members 152, 162, 172, 1482 changes accordingly. As such, over the first, second, third and fourth phases $\Phi_{1-4}$, RF energy flows occurs between different ones of the external cutting members 152, 162, 172, 1482 and by different amounts, which leads to more uniform heating of the skin in contact with the external cutting members 152, 162, 172, 1482.

A simulation was performed measuring heating of skin with an electric shaver using the modulation signals M1-M4 according to FIGS. 15*a-b*. These heating results were compared to a simulation of skin heating with an electric shaver comprising four shaver foil electrodes, to which unmodulated RF signals were applied. The electric shaver using the modulation signals M1-M4 according to FIGS. 15*a*-*b* heated a larger volume of skin by 60% compared to the electric shaver with the unmodulated RF signals. In said examples, for both shavers, each of the foil electrodes of first external cutting member 152, second external cutting member 162, third external cutting member 172 and fourth external cutting member 1482 comprise a skin-contacting area of 4×25 mm, where each foil electrode is separated by an electrically isolating gap of 4 mm. The electric shaver using the modulation signals M1-M3 used a peak-to-peak voltage magnitude of 11.V, whereas the electric shaver with the unmodulated RF signals used a voltage magnitude of 19 V.

Figure 16:
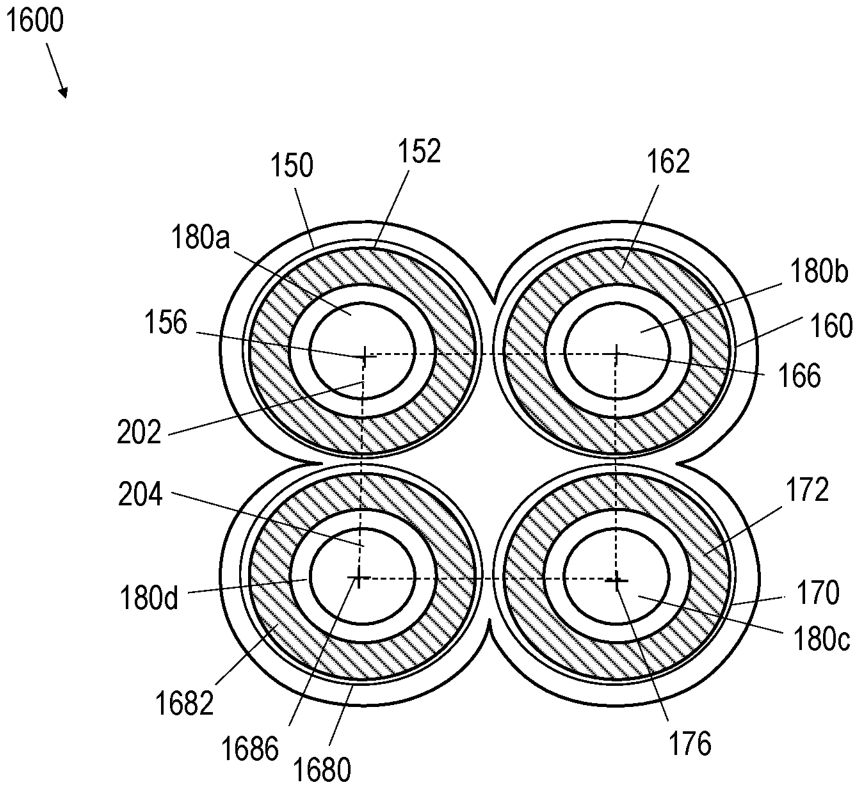
FIG. 16 is another example of a cutting head of an electric shaver.

FIG. 16 illustrates another example of an electric shaver 1600. Electric shaver 1600 comprises elements in common with Electric shaver 900 described above with respect to FIG. 9. Said corresponding elements are labelled with corresponding reference numerals and may operate in a corresponding way to that described above.

Electric shaver 1600 comprises a skin-contacting area 1610, which in a similar manner to electric shaver 900 described above, comprises first, second and third hair cutting units 150, 160, 170 each comprising a respective covering element in the form of first, second and third electrodes 180*a*-*c*. Electric shaver 1600 additionally comprises a fourth hair cutting unit 1680 comprising a covering element in the form of a fourth electrode 180*d*. Fourth covering element may thus additionally be formed of an electrically conductive material for conducting an RF voltage signal. An RF generator unit configured to generate the N periodic amplitude-modulated RF signals, as described above, may thus be electrically connected to each of the electrodes 180*a*-*d*. In use, N periodic amplitude-modulated RF signals may thus be applied to the electrodes 180*a*-*d* in a corresponding manner to that described above. As such, in use, RF energy may flow between the electrodes 180*a*-*d* within the skin of the user to warm the skin.

Due to the arrangement of the electrodes 180*a*-*d* in the electric shaver 1600, the geometric center point of each hair cutting unit 150, 160, 170, 1680 is thus aligned with the geometric center point of each of the electrodes 180*a*-*d*. The first pitch distance 202 between the geometric center points 156, 166, 176, 1686 of each pair of the hair-cutting units 150, 160, 170, 1680 is thus the same as the second pitch distance between the geometric center points of each pair of the electrodes 180*a*-*d*. In the example of electric shaver 1600, the ratio between the second minimum pitch distance 204 and the first minimum pitch distance 202 may thus be 1. As such, the electrodes 180*a*-*d* are again distributed across a major area of the skin-contacting area 910 and as such, this arrangement may result in more uniform heating in a large area of the skin in contact with the skin-contacting area 1610, in use. For example, due to the arrangement of the N electrodes 180*a*-*c*, RF energy may flow between each of the N electrodes 180*a*-*d*, such that a majority of the skin in contact with the skin-contacting area 200 is warmed by the application of the RF energy.

Figure 17A:
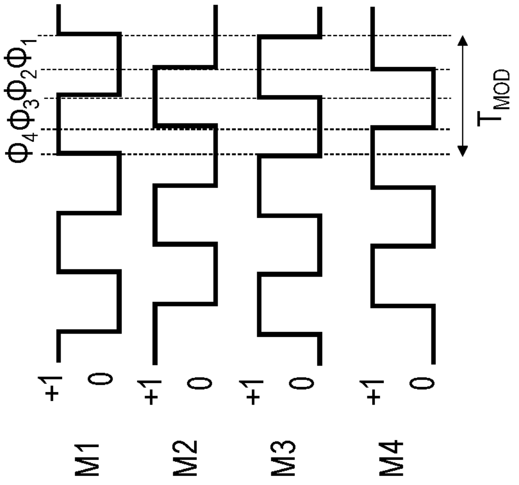
FIGS. 17*a* and 17*b* are further examples of RF energy applied to electrodes of an electric shaver.
Figure 17B:
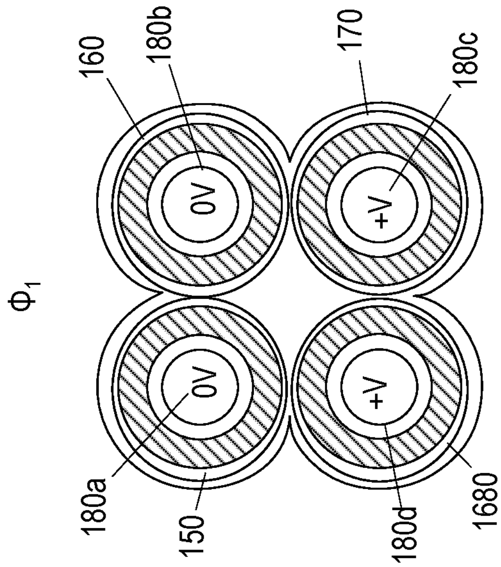

FIGS. 17*a* and 17*b* illustrate another example of how RF signals may be applied to electrodes of an electric shaver.

FIG. 17*a* illustrates N modulation signals M1-M4, where N=4. The N modulation waveforms M1-M4 comprise a first modulation signal M1 for modulating RF voltage signals $V_{RF}$ applied to a first electrode, a second modulation signal M2 for modulating RF voltage signals $V_{RF}$ applied to a second electrode, a third modulation signal M3 for modulating RF voltage signals $V_{RF}$ applied to a third electrode and a fourth modulation signal M4 for modulating RF voltage signals $V_{RF}$ applied to a fourth electrode. As illustrated in FIG. 17*b*, the first, second, third and fourth electrodes 180*a*-*d* comprise the covering elements of hair cutting units 150, 160, 170, 1680.

The N modulation signals M1-M4 each comprise a dual state modulation signal comprising a first state +1 and a second state 0. In a similar manner to that described above with respect to FIGS. 15*a*-*b*, each of the N modulation signals M1-M4 has a modulation period $T_{MOD}$, which may be divided into four phases $\Phi_{1\text{-}4}$. Thus, in a similar manner to that described above, the N modulation signals M1-M4 are phase shifted from each other across four phases $\Phi_{1\text{-}4}$ over the modulation period $T_{MOD}$ according to the condition that an $n^{th}$ of the N modulation signals M1-M4 signals has a phase difference of $T_{MOD}$*(n−1)/N relative to a first of the N modulation signals M1-M4 where 2≤n≤N.

In a similar manner to that described above, N periodic amplitude-modulated RF voltage signals, which in some examples may be referred to as N periodic amplitude-modulated RF energy signals, may be generated by application of the N modulation signals M1-M4 to an RF voltage signal. In a similar manner to that described above, the N periodic amplitude-modulated RF energy signals may comprise a plurality of values, which comprise a first value of the RF voltage signal +V a second value of a zero voltage signal 0V, depending on the state of the corresponding N modulation signal M1-M4 during a given phase.

For example, referring to FIG. 17*a*, during the first phase $\Phi_1$, the first modulation signal M1 is at the second state 0, the second modulation signal M2 is at the second state 0, the third modulation signal M3 is at the first state +1 and the fourth modulation signal M4 is at the first state +1. Thus, referring to FIG. 17*b*, during the first phase $\Phi_1$, the first electrode 180*a* receives a first periodic amplitude-modulated signal at the second value 0V, the second electrode 180*b* receives a second periodic amplitude-modulated signal at the second value 0V, the third electrode 180*d* receives a third periodic amplitude-modulated signal at the first value +V and the fourth electrode 180*d* receives a fourth periodic amplitude-modulated signal at the first value +V. Thus, in a similar manner to that described above, due to the voltage differences that exist between the electrodes 180*a*-*d* of an electric shaver during the first phase $\Phi_1$ RF energy flow may thus occur between the electrodes 180*a*-*d* to warm the skin of a user.

In a similar manner to that described above, during the second, third and fourth phases $\Phi_{2\text{-}4}$, the N periodic amplitude-modulated RF energy signals change, based on the N modulation signals M1-M4, and as such the RF energy flow between the electrodes 180*a*-*d* changes accordingly. In some examples, the modulation signals M1-M3 may thus represent the envelope of the N periodic amplitude-modulated RF energy signals S1-S3. As such, over the first, second, third and fourth phases $\Phi_{1\text{-}4}$, RF energy flows occurs between different ones of the electrodes 180*a*-*d*, which leads to more uniform heating of the skin in contact with the electrodes 180*a*-*d*.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Electric shaver (100, 900, 1000, 1100, 1400, 1600) comprising:

a skin-contacting area (200, 910, 1110, 1410, 1610) arranged to contact skin of a user during use of the shaver (100, 900, 1000, 1100, 1400, 1600);

at least two hair-cutting units (150, 160, 170, 1480, 1680) arranged in the skin-contacting area (200, 910, 1110, 1410, 1610) and each having an external cutting member (152, 162, 172, 1482, 1682) with a plurality of hair-entry openings and an internal cutting member covered by and moveable relative to the external cutting member (152, 162, 172, 1482, 1682);

N electrodes (180*a-d*) arranged in the skin-contacting area (200, 910, 1110, 1410, 1610) to contact the skin during use, wherein N is at least 3;

a radio-frequency (RF) generator (320) configured to generate RF energy having a basic frequency $f_{RF}$ and a basic period $T_{RF}=1/f_{RF}$;

an RF energy modulator (310) configured to transform the RF energy generated by the RF generator into N periodic amplitude-modulated RF energy signals (S1, S2, S3) and to provide each of the N periodic amplitude-modulated RF energy signals (S1, S2, S3) to a respective one of the N electrodes (180*a-d*);

wherein:

seen perpendicularly to the skin-contacting area (200, 910, 1110, 1410, 1610), the external cutting member (152, 162, 172, 1482, 1682) of each hair-cutting unit (150, 160, 170, 1480, 1680) has a geometric center point (156, 166, 176, 1486, 1686), a first pitch distance (202) being a distance between the geometric center points (156, 166, 176, 1486, 1686) of a pair of the hair-cutting units (150, 160, 170, 1480, 1680), and a first minimum pitch distance being a minimum of the first pitch distances (202) of all pairs of the hair-cutting units (150, 160, 170, 1480, 1680);

seen perpendicular to the skin-contacting area (200, 910, 1110, 1410, 1610), each of the N electrodes (180*a-d*) has a geometric center point (182*a-c*), a second pitch distance (204) being a distance between the geometric center points (182*a-c*) of a pair of the N electrodes (180*a-d*), and a second minimum pitch distance being a minimum of the second pitch distances (204) of all pairs of the N electrodes (180*a-d*);

a ratio between the second minimum pitch distance and the first minimum pitch distance is at least 0.8;

a basic period $T_{MOD}$ of the N periodic amplitude-modulated RF energy signals (S1, S2, S3) is larger than the basic period $T_{RF}$; and an $n^{th}$ of the N periodic amplitude-modulated RF energy signals (S1, S2, S3) has a phase difference of $T_{MOD}$* (n−1)/N relative to a first of the N periodic amplitude-modulated RF energy signals (S1, S2, S3), wherein 2≤n≤N.

2. Electric shaver as claimed in claim 1, wherein a ratio between $T_{MOD}$ and $T_{RF}$ is at least 10, preferably at least 25.

3. Electric shaver as claimed in claim 1, wherein each of the respective N periodic amplitude-modulated RF energy signals (S1, S2, S3) has an identical basic RF energy signal during the basic period $T_{MOD}$ of the respective periodic amplitude-modulated RF energy signal.

4. Electric shaver as claimed in claim 3, wherein the basic RF energy signal comprises a first state and a second state, the first state being constituted by a first RF energy signal having the basic frequency $f_{RF}$ and a first RF voltage ($V_{RF+}$, $V_{RF-}$), and the second state being constituted by a zero signal (0V).

5. Electric shaver as claimed in claim 4, wherein the basic RF energy signal further comprises a third state being constituted by a second RF energy signal inverse to the first RF energy signal.

6. Electric shaver as claimed in claim 4, wherein the second states of the N periodic amplitude-modulated RF energy signals (S1, S2, S3) do not occur simultaneously.

7. Electric shaver as claimed in claim 3, wherein the first states of the N periodic amplitude-modulated RF energy signals (S1, S2, S3) do not occur simultaneously.

8. Electric shaver as claimed in claim 3, comprising four electrodes (180*a-d*) and four hair-cutting units (150, 160, 170, 1480), wherein:

the internal cutting member of each hair-cutting unit (150, 160, 170, 1480) is configured to make a linear reciprocating motion relative to the external cutting member (152, 162, 172, 1482) parallel to a longitudinal direction, and wherein the external cutting member (152, 162, 172, 1482) of each hair-cutting unit (150, 160, 170, 1480) has a longitudinal extension parallel to the longitudinal direction;

each of the four electrodes (180*a-d*) is constituted by at least a skin-contacting portion of the external cutting member (152, 162, 172, 1482) of a respective one of the four hair-cutting units (150, 160, 170, 1480);

the basic RF energy signal comprises, successively, a first state, a second state, a third state, and a fourth state, the first state being constituted by a first RF energy signal having the basic frequency $f_{RF}$ and a first RF voltage, the second state being constituted by a second RF energy signal having the basic frequency $f_{RF}$ and a second RF voltage lower than the first RF voltage, the third state being constituted by a third RF energy signal inverse to the second RF energy signal, and the fourth state being constituted by a fourth RF energy signal inverse to the first RF energy signal.

9. Electric shaver as claimed in claim 8, wherein a ratio between the second RF voltage and the first RF voltage is between 0.25 and 0.5, preferably between 0.3 and 0.35.

10. Electric shaver as claimed in claim 1, wherein the N electrodes (180*a-d*) are arranged adjacent to the hair-cutting units (150, 160, 170).

11. Electric shaver as claimed in claim 10, comprising three electrodes (180*a-d*) and three hair-cutting units (150, 160, 170) mutually arranged in a triangular configuration, wherein the internal cutting member of each hair-cutting unit (150, 160, 170) is rotatable relative to the external cutting member (152, 162, 172), and wherein each of the three electrodes (180*a-d*) is arranged in a lateral portion of the skin-contacting area (200) between the two hair-cutting units (150, 160, 170) of a respective one of three pairs of hair-cutting units (150, 160, 170).

12. Electric shaver as claimed in claim 1, comprising N hair-cutting units (150, 160, 170, 1680), wherein the external cutting member (152, 162, 172, 1682) of each of the N hair-cutting units (150, 160, 170, 1680) is annular-shaped and wherein the N electrodes (180_a_-_d_) comprise N covering elements each arranged in a central position relative to the external cutting member (152, 162, 172, 1682) of a respective one of the N hair-cutting units (150, 160, 170, 1680).

13. Electric shaver as claimed in claim 1, comprising N hair-cutting units (150, 160, 170, 1480), wherein each of the N electrodes (180_a_-_d_) is constituted by at least a skin-contacting portion of the external cutting member (152, 162, 172, 1482) of a respective one of the N hair-cutting units (150, 160, 170, 1480).

14. Electric shaver as claimed in claim 13, comprising three hair-cutting units (150, 160, 170), wherein the internal cutting member of each hair-cutting unit (150, 160, 170) is configured to make a linear reciprocating motion relative to the external cutting member (152, 162, 172) parallel to a longitudinal direction, and wherein the external cutting member (152, 162, 172) of each hair-cutting unit (150, 160, 170) has a longitudinal extension parallel to the longitudinal direction.

15. Electric shaver as claimed in claim 1, wherein the RF energy modulator (310) comprises N switch units (730, 740, 750) each configured to apply a respective one of the N periodic amplitude-modulated RF energy signals (S1, S2, S3) to a respective one of the N electrodes (180_a_-_d_).

* * * * *